United States Patent [19]
Usui et al.

[11] Patent Number: 5,933,579
[45] Date of Patent: Aug. 3, 1999

[54] METHOD AND APPARATUS FOR SIMULATING COLOR PRINT

[75] Inventors: Nobuaki Usui, Tokyo; Atsushi Imamura, Kyoto, both of Japan

[73] Assignee: Dainippon Screen Mfg. Co., Ltd., Japan

[21] Appl. No.: 08/883,919

[22] Filed: Jun. 27, 1997

[30] Foreign Application Priority Data

Jun. 28, 1996 [JP] Japan .................................. 8-188373

[51] Int. Cl.$^6$ .................................................. G06F 15/00
[52] U.S. Cl. .......................... 395/109; 358/518; 358/525
[58] Field of Search .................................. 395/109, 101; 358/518, 519, 520, 525, 509, 527, 531, 500, 501, 504, 510, 515, 516, 517, 530, 512, 502, 503; 382/167, 162; 345/147, 150, 426; 348/191

[56] References Cited

U.S. PATENT DOCUMENTS

| | | | |
|---|---|---|---|
| 4,905,039 | 2/1990 | Terashita | 355/35 |
| 5,272,518 | 12/1993 | Vincent | 356/405 |
| 5,408,447 | 4/1995 | Cottrell et al. | 358/509 |
| 5,485,556 | 1/1996 | Takagi et al. | 345/426 |
| 5,596,425 | 1/1997 | Usui et al. | 358/500 |

FOREIGN PATENT DOCUMENTS

| | | |
|---|---|---|
| 529967 | 3/1993 | European Pat. Off. . |
| 669754 | 8/1995 | European Pat. Off. . |
| 5-115002 | 5/1993 | Japan . |

OTHER PUBLICATIONS

R. Balasubramanian, "Colorimetric Modeling of Binary Color Printers", *Proceedings Of The International Conference On Image Processing*, Washington, Oct. 23–26, 1995, vol. 2, Institute of Electrical and Electronics Engineers, pp. 327–330.

H. Kang, "Applications of color mixing models to electronic printing", *Journal Of Electronic Imaging*, vol. 3., No. 3, Jul. 1994, pp. 276–287.

*Primary Examiner*—Dov Popovici
*Attorney, Agent, or Firm*—Ostrolenk, Faber, Gerb & Soffen, LLP

[57] ABSTRACT

An illuminance spectrum I of reflected light from a color print of an arbitrary dot percent d is defined by a diffuse reflection coefficient Sb(d,λ) and a specular reflection coefficient Ss(d,λ). The diffuse reflection coefficient Sb(d,λ) is determined by linear interpolation of a plurality of reference reflection coefficients Sb($d_i$,λ) for a plurality of reference dot percents $d_i$. The specular reflection coefficient Ss(d,λ) is also determined by linear interpolation of a plurality of reference reflection coefficients Ss($d_j$,λ) for a plurality of reference dot percents $d_j$. The illuminance spectrum of reflected light is then determined according to these reflection coefficients Sb(d,λ) and Ss(d,λ). Color data representing the colors of the print in a calorimetric system suitable for an output device are subsequently generated from the illuminance spectrum.

9 Claims, 18 Drawing Sheets

Fig. 6(A) GRADATION (11 COLOR CHIPS)

| 0 % | 10 | 20 | 30 | 40 | 50 | 60 | 70 | 80 | 90 | 100 % |
|---|---|---|---|---|---|---|---|---|---|---|

Fig. 6(B) MEASUREMENT CONDITIONS OF SPECTRAL REFLECTIVITY (FOR EACH COLOR CHIP)

| θ \ ρ | -10° | -8° | -2° | 0° | 2° | 34° | 35° |
|---|---|---|---|---|---|---|---|
| 8° | ○ | ○ | ○ | ○ | ○ | ○ | ○ |
| 10° | ○ | ○ | ○ | ○ | ○ | ○ | ○ |

Fig. 6(C) MEASUREMENT OF SPECTRAL REFLECTIVITY (UNDER EACH CONDITION)

COMPARISON BETWEEN MEASURED VALUES OF DIFFUSE REFLECTION COMPONENT Sb(d, $\lambda$) · cos$\theta$ (SOLID LINES) AND RESULTS OF SIMULATION (BROKEN LINES)

METHOD AND APPARATUS FOR SIMULATING COLOR PRINT

BACKGROUND OF THE INVENTION

1. Field of the Invention

The present invention relates to a technique of reproducing color prints with an output device, such as a display device or a printer.

2. Description of the Related Art

In reproducing a color print with a variety of output devices including a display device and a printer, it is desirable to reproduce colors closest possible to those of the actual color print. The conventional method of reproducing colors of a print utilizes a known equation, such as Marley-Davis's Equation, Jule-Nielsen's Equation, or Neugebauer's Equation. For example, Neugebauer's Equation is used to calculate the values of color components R, G, and B from the dot percents of four color inks Y, M, C, and K.

The known conversion equations are, however, based on an ideal model and can not reproduce the actual colors in many cases. Especially, no model is applicable for simulating observation of a print arranged in a three-dimensional space.

The applicant of the present invention has proposed a method of reproducing a print arranged in a three-dimensional space, as disclosed in U.S. Pat. No. 5,596,425. This proposed method determines an illuminance spectrum $I(\theta, \rho, \lambda)$ of reflected light from a color print according to a specular reflection coefficient $Ss(\lambda)$ and an internal reflection coefficient $Sb(\lambda)$, and displays the color print based on the illuminance spectrum $I(\theta, \rho, \lambda)$, where $\theta$ denotes an angle of reflection, $\rho$ denotes an angle of deviation, and $\lambda$ denotes a wavelength. This method can faithfully reproduce a print having a specific dot percent, such as 100%, of a single primary color, but it requires the values of the reflection coefficients $Ss(\lambda)$ and $Sb(\lambda)$ for the entire range of the dot percent in reproducing a color print having an arbitrary dot percent. For this purpose, a large number of samples should be measured to obtain their colorimetry data in advance.

SUMMARY OF THE INVENTION

Accordingly, an object of the present invention is to provide a technique for readily reproducing an image portion having an arbitrary dot percent included in a color print with less data than conventional techniques.

In order to attain at least part of the above and other objects of the present invention, there is provided a method of simulating a color print arranged in a three-dimensional space by rendering the color print and thereby reproducing the color print with an output device. The method uses an illuminance spectrum $I(d,\theta,\rho,\lambda)$ of a reflected light beam is used, which is observed at a predetermined observation point when a target point on the color print is irradiated with a light beam having a predetermined luminance spectrum $\phi(\lambda)$. The illuminance spectrum $I(d,\theta,\rho,\lambda)$ is given by the following Equation:

$$I(d,\theta,\rho,\lambda) = \{Sb(d,\lambda) \cdot fb(\theta) + Ss(d,\lambda) \cdot fs(\rho)\} \cdot \phi(\lambda) + Ie(\lambda)$$

where d denotes a dot percent at the target point, $\lambda$ denotes a wavelength of the light beam, $Sb(d,\lambda)$ and $Ss(d,\lambda)$ respectively denote a first reflection coefficient and a second reflection coefficient for the dot percent, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at the observation point. The method comprises the steps of: (a) determining a first reflection coefficient $Sb(d,\lambda)$ in the Equation by interpolation of a plurality of first reference reflection coefficients $Sb(d_i,\lambda)$ for a plurality of reference dot percents $d_i$, and determining a second reflection coefficient $Ss(d,\lambda)$ by interpolation of a plurality of second reference reflection coefficients $Ss(d_j,\lambda)$ for a plurality of reference dot percents $d_j$. The method further comprises the steps of: (b) determining the illuminance spectrum $I(d,\theta,\rho,\lambda)$ of the reflected light beam according to the Equation using the first reflection coefficient $Sb(d,\lambda)$ and the second reflection coefficient $Ss(d,\lambda)$ determined in the step (a); and (c) obtaining color data representing the target color in a colorimetric system suitable for the output device from the illuminance spectrum $I(d,\theta,\rho,\lambda)$ of the reflected light beam.

According to the above method, the illuminance spectrum $I(d,\theta,\rho,\lambda)$ of the target point having an arbitrary dot percent d can be determined by interpolation, and the spectrum can be converted to color data suitable for the output device. Accordingly, an image portion having an arbitrary dot percent in a color print can be readily reproduced with less data than conventional techniques.

In a preferred embodiment, the first reflection coefficient $Sb(d,\lambda)$ and the second reflection coefficient $Ss(d,\lambda)$ are given by:

$$Sb(d, \lambda) = \sum_{i=1}^{N} a_i(d) \cdot Sb(d_i, \lambda)$$

$$Ss(d, \lambda) = \sum_{j=1}^{M} b_j(d) \cdot Ss(d_j, \lambda)$$

where $a_i(d)$ denotes a weighting coefficient for the first reference reflection coefficient $Sb(d_i,l)$ at the dot percent d, $b_j(d)$ denotes a weighting coefficient for the second reference reflection coefficient $Ss(d_j,l)$ at the dot percent d, and N and M are integers no less than two.

The characteristics $fb(\theta)$ and $fs(\rho)$ may be give by:

$$fb(\theta) = \cos \theta$$

$$fs(\rho) = e^{-\sigma \rho^2}$$

where $\sigma$ is a constant.

In another embodiment, the step (a) comprises the steps of: determining the weighting coefficients $a_i(d)$ by interpolating a plurality of reference weighting coefficients $a_i(d_k)$ at a plurality of dot percents $d_k$; and determining the weighting coefficients $b_j(d)$ by interpolating a plurality of reference weighting coefficients $b_j(d_l)$ at a plurality of dot percents $d_l$.

According to an aspect of the present invention, there is provided an apparatus for simulating a color print arranged in a three-dimensional space by rendering the color print and thereby reproducing the color print with an output device. The apparatus comprises: reflection coefficients determining means for determining a first reflection coefficient $Sb(d,\lambda)$ in the Equation defining the illuminance spectrum $I(d,\theta,\rho,\lambda)$ by interpolation of a plurality of first reference reflection coefficients $Sb(d_i,\lambda)$ for a plurality of reference dot percents $d_i$, and determining a second reflection coefficient $Ss(d,\lambda)$ by interpolation of a plurality of second reference reflection coefficients $Ss(d_j,\lambda)$ for a plurality of reference dot percents $d_j$; means for determining the illuminance spectrum $I(d,\theta,\rho,\lambda)$ of the reflected light beam according to the Equation using the first reflection coefficient $Sb(d,\lambda)$ and the second reflection coefficient $Ss(d,\lambda)$ determined by the reflection coefficients determining means; and means for obtaining color data representing the target color in a colorimetric system suitable for the output device from the illuminance spectrum $I(d,\theta,\rho,\lambda)$ of the reflected light beam.

According to another aspect of the present invention, there is provided a computer program product for simulating a color print arranged in a three-dimensional space by rendering the color print and thereby reproducing the color print with an output device. The computer program product comprises: a computer readable medium; and a computer program code means stored on the computer readable medium. The computer program code means comprises: first program code means for causing a computer to determine a first reflection coefficient $Sb(d,\lambda)$ in the Equation defining the illuminance spectrum $I(d,\theta,\rho,\lambda)$ by interpolation of a plurality of first reference reflection coefficients $Sb(d_i,\lambda)$ for a plurality of reference dot percents $d_i$, and to determine a second reflection coefficient $Ss(d,\lambda)$ by interpolation of a plurality of second reference reflection coefficients $Ss(d_j,\lambda)$ for a plurality of reference dot percents $d_j$; second program code means for causing the computer to determining the illuminance spectrum $I(d,\theta,\rho,\lambda)$ of the reflected light beam according to the Equation using the first reflection coefficient $Sb(d,\lambda)$ and the second reflection coefficient $Ss(d,\lambda)$ determined by the first program code means; and third program code means for causing the computer to obtain color data representing the target color in a calorimetric system suitable for the output device from the illuminance spectrum $I(d,\theta,\rho,\lambda)$ of the reflected light beam.

These and other objects, features, aspects, and advantages of the present invention will become more apparent from the following detailed description of the preferred embodiments with the accompanying drawings.

DESCRIPTION OF THE PREFERRED EMBODIMENT

A. Outline of the Process of Creating Color Data

Figure 1:
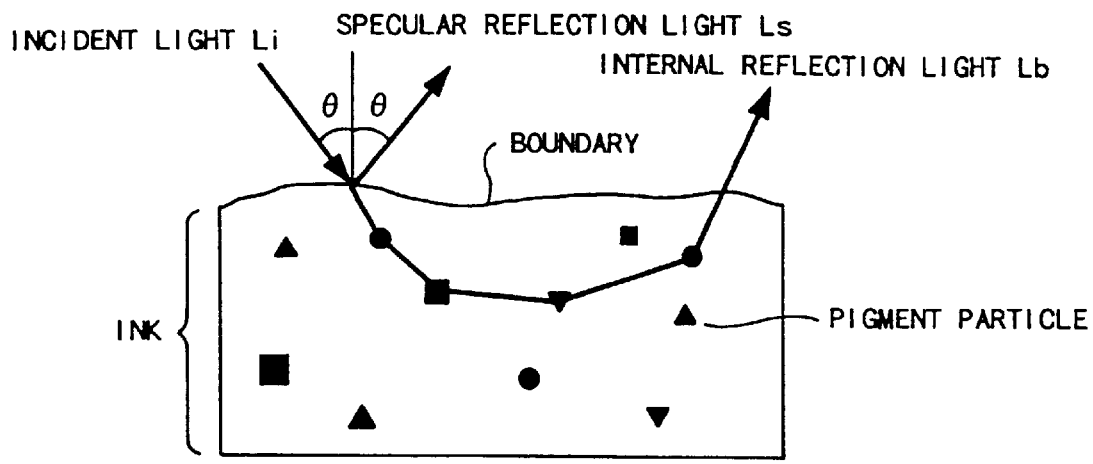
FIG. 1 illustrates a process of reflecting an incident light beam from an ink applied on a printing sheet.

FIG. 1 illustrates a process of reflecting incident light from an ink applied on a printing sheet. Referring to FIG. 1, an incident light beam Li to an ink is reflected by two different pathways. A first reflected light beam is a specular reflection light beam Ls reflected from a boundary between the surface of the ink and an air layer. A second reflected light beam is a diffuse reflected light beam Lb (also referred to as 'internal reflection light beam'), which passes through the surface of the ink, scattered by the ink and particles in the sheet, and eventually goes outside.

Figure 2:
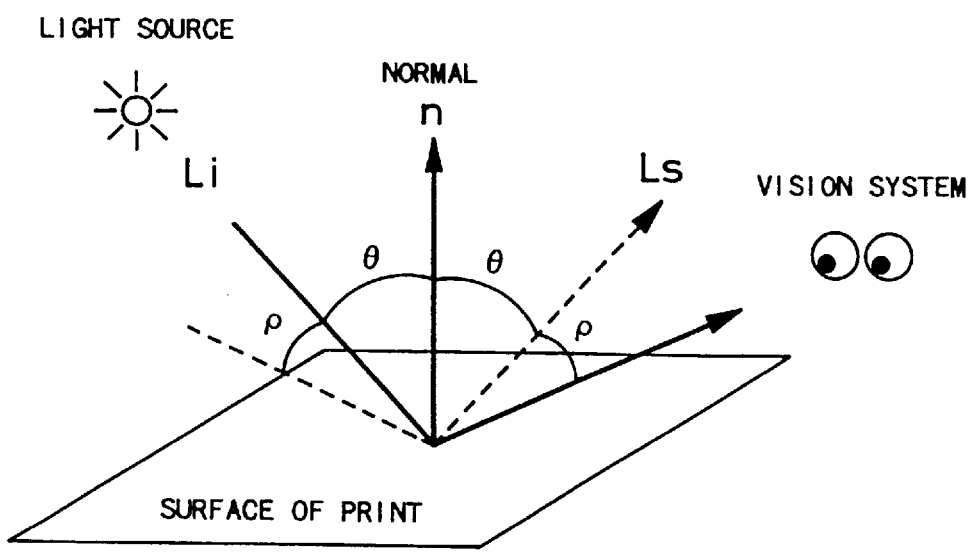
FIG. 2 shows the relationship between a light source, a print, and a vision system.

FIG. 2 shows the relationship between a light source, a print, and a vision system (observer). Referring to FIG. 2, the position of the vision system is generally deviated from the direction of the specular reflection light beam Ls by an angle $\rho$ (hereinafter referred to as the angle of deviation). The direction from a reflection point of the light beam on the surface of the print toward the vision system (that is, the direction of observation) may not exist on a specific plane including the incident light beam Li and the specular reflection light beam Ls. Even in this case, the angle of the specular reflection light beam Ls and the direction of observation is defined by the angle of deviation $\rho$.

In the drawing of FIG. 2, the illuminance of the reflected light observed by the observer can be expressed as a linear combination of the illuminance of the specular reflection light beam Ls, the illuminance of the diffuse reflected light beam Lb, and the illuminance of ambient light, by the following Equation (1):

$$I(\theta,\rho,\lambda)=Ib(\theta,\lambda)+Is(\rho,\lambda)+Ie(\lambda) \qquad (1)$$

wherein $\lambda$ denotes a wavelength of a light beam, $I(\theta, \rho, \lambda)$ denotes an illuminance spectrum of a reflected light beam observed, $Ib(\theta, \rho, \lambda)$ denotes an illuminance spectrum of the diffuse reflected light beam Lb, $Is(\theta, \rho, \lambda)$ denotes an illuminance spectrum of the specular reflection light beam, and $Ie(\lambda)$ denotes an illuminance spectrum of ambient light. The illuminance spectra $I(\theta, \rho, \lambda)$, $Is(\theta, \rho, \lambda)$, and $Ib(\theta, \rho, \lambda)$ depend upon an angle of reflection $\theta$, the angle of deviation $\rho$, and the wavelength $\lambda$. The illuminance spectrum $Ie(\lambda)$ of ambient light is an element attributable to the ambient light observed at an observation point and including light from a standard light source and natural light. The illuminance spectrum $Ie(\lambda)$ of ambient light does not depend upon the angle of reflection $\theta$ or the angle of deviation $\rho$, but depends upon only the wavelength $\lambda$.

Assuming that the illuminance spectra $Is(\theta, \rho, \lambda)$, and $Ib(\theta, \rho, \lambda)$ included in Equation (1) are respectively divided into an angular element and a wavelength element as defined by Equations (2a) and (2b) given below, Equation (1) can be rewritten as Equation (3):

$$Ib(\theta,\lambda)=Sb(\lambda)\cdot fb(\theta)\cdot \phi(\lambda) \quad (2a)$$

$$Is(\rho,\lambda)=Ss(\lambda)\cdot fs(\rho)\cdot \phi(\lambda) \quad (2b)$$

$$I(\theta,\rho,\lambda)=\{Sb(\lambda)\cdot fb(\theta)+Ss(\lambda)\cdot fs(\rho)\}\cdot \phi(\lambda)+Ie(\lambda) \quad (3)$$

wherein $Sb(\lambda)$ denotes a diffuse reflection coefficient, $Ss(\lambda)$ denotes a specular reflection coefficient, and $\phi(\lambda)$ denotes a luminance spectrum of the incident light beam.

As is known, an angle-dependent characteristic $fb(\theta)$ of the diffuse reflected light beam Lb is expressed by $\cos \theta$. The illuminance of the specular reflection light beam Ls reaches its maximum on observation in the reflecting direction along the angle of reflection $\theta$ (that is, the direction of $\theta=0°$, and abruptly decreases with a deviation from the reflecting direction. A characteristic $fs(\rho)$ included in Equation (3) represents this phenomenon. It is accordingly thought that the function $fs(\rho)$ represents the characteristic that is equal to one when $\rho=0$ and abruptly decreases in a monotonic manner with an increase in $\rho$ in the range of $0 \leq \rho \leq 90°$. As is known, for example, the n-th power of $\cos \theta$ (n is a constant experimentally determined) may be used as the characteristic $fs(\rho)$. In this embodiment, however, the functional form of the characteristic $fs(\rho)$ is determined based on the measurement of reflected light as discussed below.

Equation (3) given above does not take into account the dot percents of the color print. In the description below, it is assumed that the color print is printed in a single ink and that the dot percent of the ink is 'd'. In Equation (3), only the diffuse reflection coefficient Sb and the specular reflection coefficient Ss depend upon the dot percents d. Equation (3) is accordingly rewritten as Equation (4) given below:

$$I(d,\theta,\rho,\lambda)=\{Sb(d,\lambda)\cos \theta+Ss(d,\lambda)\cdot fs(\rho)\}\cdot \phi(\lambda)+Ie(\lambda) \quad (4)$$

When an illuminance spectrum $I(d,\theta,\rho,\lambda)$ of the reflected light is obtained for a printed area having the dot percents of d, three stimulus values X(d), Y(d), and X(d) in the CIE-XYZ colorimetric system are defined by Equations (5a)–(5c) given below according to the definition:

$$X(d) = k \int_{380}^{720} I(d, \theta, \rho, \lambda) \cdot \bar{x}(\lambda) d\lambda \quad (5a)$$

$$Y(d) = k \int_{380}^{720} I(d, \theta, \rho, \lambda) \cdot \bar{y}(\lambda) d\lambda \quad (5b)$$

$$Z(d) = k \int_{380}^{720} I(d, \theta, \rho, \lambda) \cdot \bar{z}(\lambda) d\lambda \quad (5c)$$

wherein $x(\lambda)$, $y(\lambda)$, and $z(\lambda)$ denote isochromatic functions. As a matter of convenience, bars above the letters x, y, and z are omitted in the text except Equations.

Conversion of the three stimulus values X(d), Y(d), and Z(d) obtained according to Equations (5a)–(5c) or chromaticity coordinates thereof (x,y,z) into color data in a colorimetric system of the output device (for example, RGB calorimetric system) enables colors of the printed area having the dot percents of d to be faithfully reproduced by the output device.

The illuminance spectrum $Ie(\lambda)$ of the ambient light, which is the third term in the right-hand side of Equation (4), is set to a fixed value according to the observation environment of the color print. Determination of the terms other than the illuminance spectrum $Ie(\lambda)$ of the ambient light in Equation (4) will give the illuminance spectrum I of the reflected light in an arbitrary observation environment. The following describes a process of determining the illuminance spectrum I of the reflected light when the illuminance spectrum $Ie(\lambda)$ of the ambient light is equal to zero.

Upon condition that the illuminance spectrum $Ie(\lambda)$ of the ambient light is equal to zero, Equation (4) is rewritten as Equation (6) given below:

$$I(d, \theta, \rho, \lambda) = Ib(d, \theta, \lambda) + Is(d, \rho, \lambda) \quad (6)$$

$$= \{Sb(d, \lambda) \cdot \cos \theta + Ss(d, \lambda) \cdot fs(\rho)\} \cdot \phi(\lambda)$$

What is to be known here is the diffuse reflection coefficient $Sb(d,\lambda)$ and the specular reflection coefficient $Ss(d,\lambda)$ at the dot percent d and a concrete form of the characteristic $fs(\rho)$ depending upon the angle of deviation $\rho$.

In this embodiment, it is assumed that the diffuse reflection coefficient $Sb(d,\lambda)$ for an arbitrary dot percent d is given by Equation (7) given below:

$$Sb(d,\lambda)=\alpha(d)\cdot Sb(0\%,\lambda)+\beta(d)\cdot Sb(50\%,\lambda)+\gamma(d)\cdot Sb(100\%,\lambda) \quad (7)$$

$$0 \leq d \leq 100\%$$

wherein $\alpha(d)$, $\beta(d)$, and $\gamma(d)$ denote weighting coefficients. The diffuse reflection coefficient $Sb(d,\lambda)$ at an arbitrary dot percent d is expressed as a linear combination of diffuse reflection coefficients $Sb(d=0\%,\lambda)$, $Sb(d=50\%,\lambda)$, and $Sb(d=100\%,\lambda)$ at three reference dot percents (d=0%, 50%, 100%).

Figure 3:
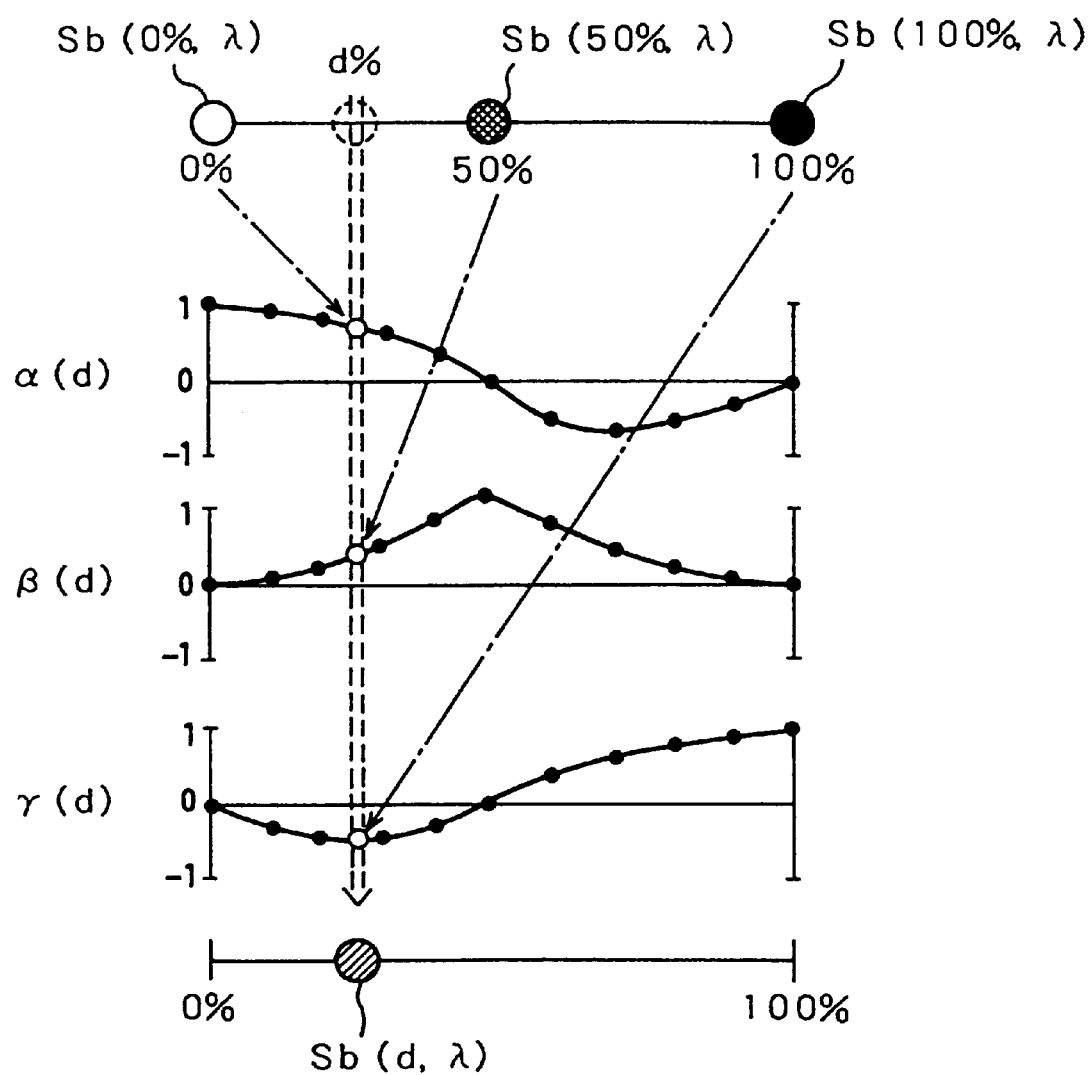
FIG. 3 shows a method of determining a diffuse reflection coefficient $Sb (d,\lambda)$ for the primary color.

FIG. 3 shows a method of determining the diffuse reflection coefficient Sb for the primary color according to Equation (7). Reference diffuse reflection coefficients $Sb(0\%,\lambda)$, $Sb(50\%,\lambda)$, and $Sb(100\%,\lambda)$ are experimentally determined in advance at reference dot percents (0%,50%,100%) as discussed later. The reference diffuse reflection coefficients $Sb(0\%,\lambda)$, $Sb(50\%,\lambda)$, and $Sb(100\%,\lambda)$ depend upon the wavelength $\lambda$ of a light beam and are thereby determined for plural values of the wavelength $\lambda$ as discussed later. By way of example, the wavelength range of visible rays (about 380 to 780 nm) is divided into approximately 60 wavelength domains, and the reference diffuse reflection coefficients $Sb(0\%,\lambda)$, $Sb(50\%,\lambda)$, and $Sb(100\%,\lambda)$ for each wavelength domain are obtained in advance. A concrete procedure of determining the reference diffuse reflection coefficients $Sb(0\%,\lambda)$, $Sb(50\%,\lambda)$, and $Sb(100\%,\lambda)$ will be discussed later.

The respective weighting coefficients $\alpha(d)$, $\beta(d)$, and $\gamma(d)$ depend upon the dot percent d as shown in FIG. 3. The value of the weighting coefficient $\alpha(d)$ with respect to the reference diffuse reflection coefficient $Sb(0\%,\lambda)$ is equal to one when the dot percent d of a target printed area is equal to 0%, and equal to zero when the dot percent d is equal to 50% or 100%. Each of the weighting coefficients $\alpha$, $\beta$, and $\gamma$ is equal to one when the dot percent d of a target printed area is equal to a dot percent $d_i$ of a reference diffuse reflection coefficient $Sb(d_i,\lambda)$ related to the weighting coefficient concerned, and equal to zero when the dot percent d is equal to a dot percent $d_j$ of another reference diffuse reflection coefficient $Sb(d_j,\lambda)$.

Referring to FIG. 3, a variation in weighting coefficient $\alpha(d)$ is represented by eleven points (shown by closed circles in the drawing) in the range of $0 \leq d \leq 100\%$. The value of the weighting coefficient $\alpha(d)$ at an arbitrary dot percent d is determined by interpolating the eleven values of the coefficient α. One available process determines the weighting coefficient α(d) by linearly interpolating the two values of coefficient closest to the target dot percent d. Another available process determines the weighting coefficient α(d) by non-linearly interpolating the values of coefficient at three or more different points. This is also applicable to the other weighting coefficients β(d), and γ(d).

The specular reflection coefficient Ss(d,λ) at an arbitrary dot percent d is defined by Equation (8), which is similar to Equation (7):

$$Ss(d,\lambda)=\alpha(d)\cdot Ss(0\%,\lambda)+\beta(d)\cdot Ss(50\%,\lambda)+\gamma(d)\cdot Ss(100\%,\lambda) \quad (8)$$

$$0\leq d\leq 100\%$$

The weighting coefficients α, β, and γ in Equation (8) may be identical with those in Equation (7). Alternatively the weighting coefficients for the diffuse reflection coefficients Sb(d,λ) and those for the specular reflection coefficient Ss(d,λ) may be determined independently.

Figure 4:
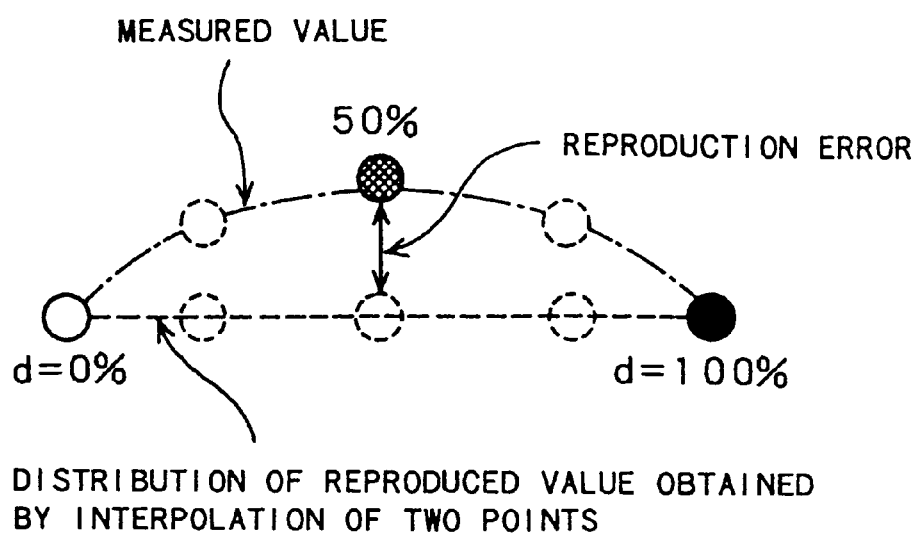
FIG. 4 conceptually shows advantages of the method of determining a reflection coefficient for the primary color by interpolating three reference reflection coefficients.

FIG. 4 conceptually shows advantages of the method of determining a reflection coefficient Sb(d, λ) at an arbitrary dot percent d by interpolating the three reference diffuse reflection coefficients Sb(0%,λ), Sb(50%,λ), and Sb(100%, λ) as shown in FIG. 3. The broken line on the bottom of FIG. 4 represents the reproduced values obtained by interpolating the two points of 0% and 100%. The one-dot chain line represents measured values. The reproduced values by interpolation of two points tends to have a substantial reproduction error at the dot percent d close to 50%. In this embodiment, the point of the dot percent=50% is added as a basis for interpolation, and a reproduced value at an arbitrary dot percent is approximated by a linear combination of the three points of 0%, 50%, and 100% according to Equations (7) and (8) discussed above. This procedure decreases the reproduction error at the dot percent close to 50%.

It is required to determine the following components in advance, in order to determine an illuminance spectrum I(d,θ,ρ,λ) of reflected light from a printed area at an arbitrary dot percent d according to Equations (6) through (8) discussed above:

(1) reference diffuse reflection coefficients Sb(0%,λ), Sb(50%,λ), and Sb(100%,λ);

(2) reference specular reflection coefficients Ss(0%,λ), Ss(50%,λ), and Ss(100%,λ);

(3) variations in weighting coefficients α(d), β(d), and γ(d) (see FIG. 3); and (4) form of the characteristic fs(ρ) depending upon the angle ρ.

The following describes a method of determining the above required components (hereinafter referred to as 'reference data') and reproducing a print based on these reference data.

B. Processing Routine in Embodiment

Figure 5:
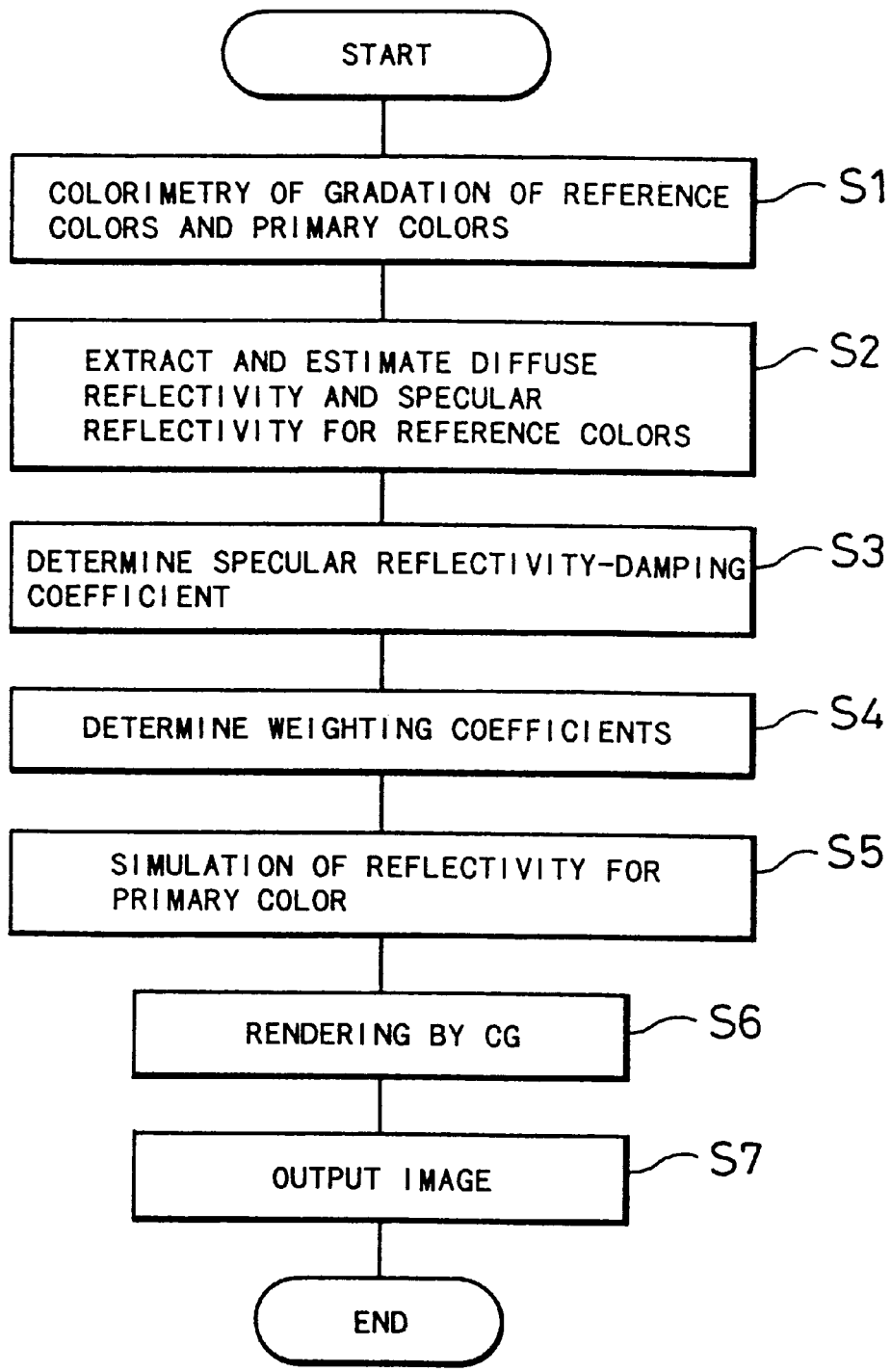
FIG. 5 is a flowchart showing a processing routine executed in the embodiment.

FIG. 5 is a flowchart showing a processing routine executed in the embodiment. At step S1 in FIG. 5, a gradation was produced including the reference colors and a plurality of primary colors other than the reference colors with a single ink, and a spectral reflectivity of the gradation was measured. The 'reference color' here denotes the color of the color chip which has a dot percent related to one of the reference reflection coefficients in the above Equations (7) and (8) (that is, 0%, 50%, and 100%). The 'primary color' denotes a color painted with a single ink. The reference colors are the primary colors whose dot percent is related to one of the reference reflection coefficients. The 'gradation' denotes a print in which color chips of the reference colors and the primary colors are arranged in the order of the dot percent.

Figure 6:
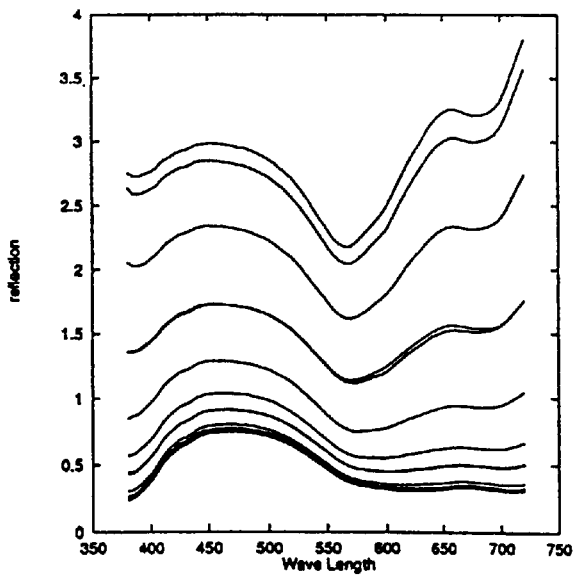
FIGS. 6(A)–6(C) show the details of the process carried out at step S1.

FIGS. 6(A)–6(C) show the details of the process carried out at step S1. In the gradation, a single printing ink (for example, cyan) was applied on each chip by the dot percent of 0% to 100% by every 10% as shown in FIG. 6(A). FIG. 6(B) shows conditions of measurement of the spectral reflectivity. The spectral reflectivity is obtained by normalizing the illuminance spectrum I(d,θ,ρ,λ) of reflected light with a luminance spectrum φ(λ) of incident light, and is accordingly expressed as I(d,θ,ρ,λ)/φ(λ). As shown in FIG. 6(B), two points of 8° and 10° were set as the angle of reflection θ in this embodiment. The angles in the range of −10° to 34° by every 2° and the angle of 35° were set as the angle of deviation ρ. In Equation (6) discussed above, cos θ is the only component depending upon the angle of reflection θ. One value is accordingly sufficient for the angle of reflection θ as the condition of measurement. In this embodiment, however, two values were set as the angle of reflection θ for the purpose of improving the accuracy. The angle of deviation ρ was set at relatively small intervals, in order to determine the dependency of the element fs(ρ) upon the angle of deviation ρ (that is, the functional form of fs(ρ)).

Figure 7:
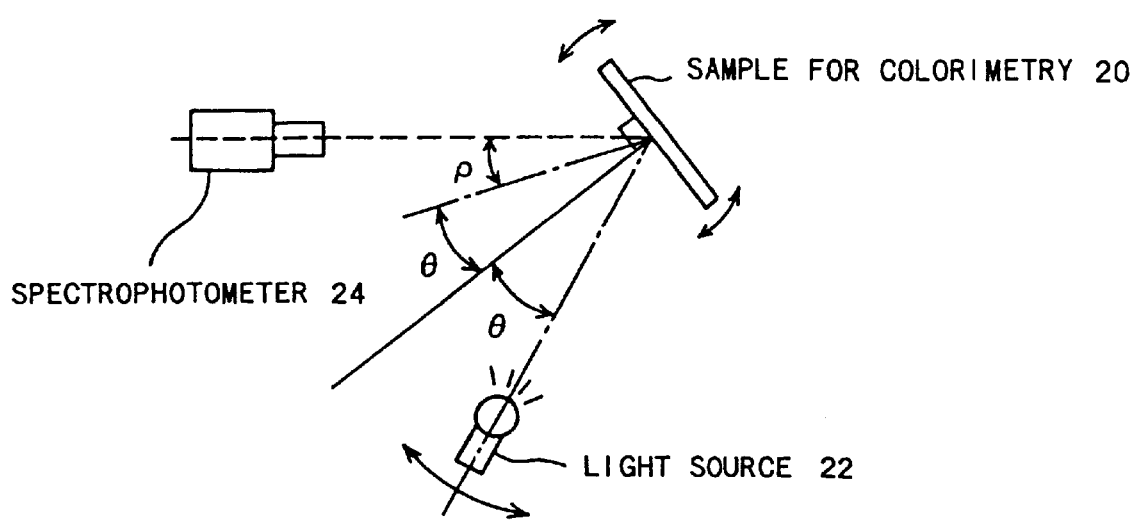
FIG. 7 conceptually illustrates an apparatus for measuring the spectral reflectivity.

At step S1, the spectral reflectivity shown in FIG. 6(C) was measured under each of the measurement conditions shown in FIG. 6(B) for each of the eleven color chips shown in FIG. 6(A). FIG. 7 conceptually illustrates an apparatus for measuring the spectral reflectivity. A colorimetry sample 20 was mounted on a sample table (not shown) and irradiated with a light beam emitted from a light source 22, and the illuminance spectrum I(d,θ,ρ,λ) of reflected light was measured by a spectrophotometer 24. A standard white plate as well as the respective color chips of the gradation shown in FIG. 6(A) were used as the colorimetry sample 20. The standard white plate used in the embodiment has the spectral reflectivity approximately equal to one. The illuminance spectrum of reflected light from the standard white plate accordingly corresponds to the luminance spectrum φ(λ) of incident light. The spectral reflectivity was thus calculated by normalizing the illuminance spectrum I(d,θ,ρ,λ) of reflected light for each color chip with the luminance spectrum φ(λ) for the standard white plate. The standard white plate has the specular reflection component substantially equal to zero, and its measurement accordingly does not depend upon the angle of deviation ρ. The angle of incidence θ for the standard white plate was set identical with those of the other samples of colorimetry (at least either of 8° and 10°) while the angle of deviation ρ was set equal to −10°.

The measured data were analyzed by a personal computer. The light source 22 used was a day-light flood lamp of standard light D65. The measurement was carried out in a darkroom in order to realize the ideal observation condition free from ambient light.

Figure 8:
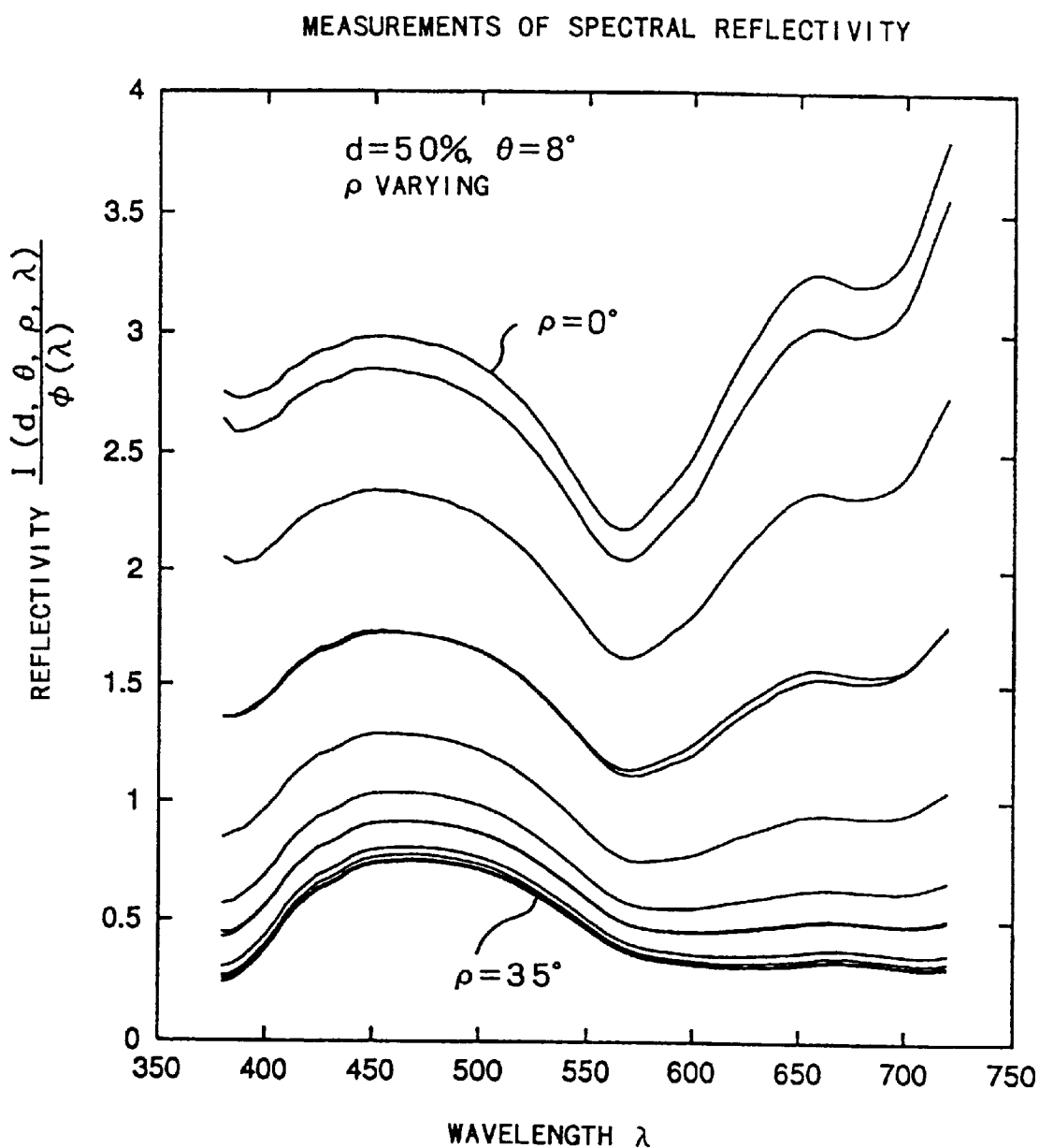
FIG. 8 is a graph showing the measurements of spectral reflectivity.

FIG. 8 is an enlarged graph showing the measured spectral reflectivity shown in FIG. 6(C). This graph shows a plurality of results of measurement with respect to various values of the angle of deviation ρ under the condition of the dot percent d=50% and the angle of incidence θ=8°. The reflectivity of 1.0 represents the level of the illuminance spectrum of the standard white plate. The spectral reflectivity of the colorimetry sample may exceed 1.0. This is because the measurement of the standard white plate does not include the specular reflection component and the measurements of the colorimetry sample including the specular reflection component may thus be greater than that of the standard white plate.

Referring back to the flowchart of FIG. 5, at step S2, diffuse reflection components $Ib(d,\theta,\lambda)$ in Equation (6) was extracted from the measured spectral reflectivity, and specular reflection components $Is(d,\rho,\lambda)$ was estimated. FIG. 9 shows a process of determining the diffuse reflection components and the specular reflection components based on the spectral reflectivities and subsequently determining the weighting coefficients $\alpha$, $\beta$, and $\gamma$. At step S2, the diffuse reflection components shown in FIG. 9(B) were extracted from the spectral reflectivities shown in FIG. 9(A), and the specular reflection components shown in FIG. 9(C) were estimated.

The spectral reflectivities under the condition of $\rho=35°$ and $\theta=8°$ were used for the extraction of the diffuse reflection component. Since the dependency upon the angle of incidence $\theta$ is known to be defined as $\cos\theta$, either one of $8°$ and $10°$ may be selected for the value of the angle of incidence $\theta$. The largest value $35°$ among the measurement conditions was selected as the angle of deviation $\rho$. The following gives the reason of such selection. As discussed previously, the dependency $fs(\rho)$ upon the angle of deviation $\rho$ included in Equation (6) represents the characteristic that is equal to one when $\rho=0$ and abruptly decreases in a monotonic manner with an increase in $\rho$ in the range of $0 \leq \rho \leq 90°$. As clearly understood from Equation (6), upon condition that $\rho$ is sufficiently large and the angular component $fs(\rho)$ can be regarded as zero, the specular reflection component $Is(d,\theta,\lambda)/\phi(\lambda)=Ss(d,\lambda)fs(\rho)$ is equal to zero. Under such conditions, the measured spectral reflectivity would correspond to the diffuse reflection component $Ib(d,\theta,\lambda)/\phi(\lambda)=Sb(d,\lambda)\cos\theta$. Since the angular component $fs(\rho)$ has a value close to $\cos^n\rho$, where n ranges approximately from 300 to 400, the value of $fs(35°)$ can be regarded as zero while the error due to it is negligibly small.

Figure 10:
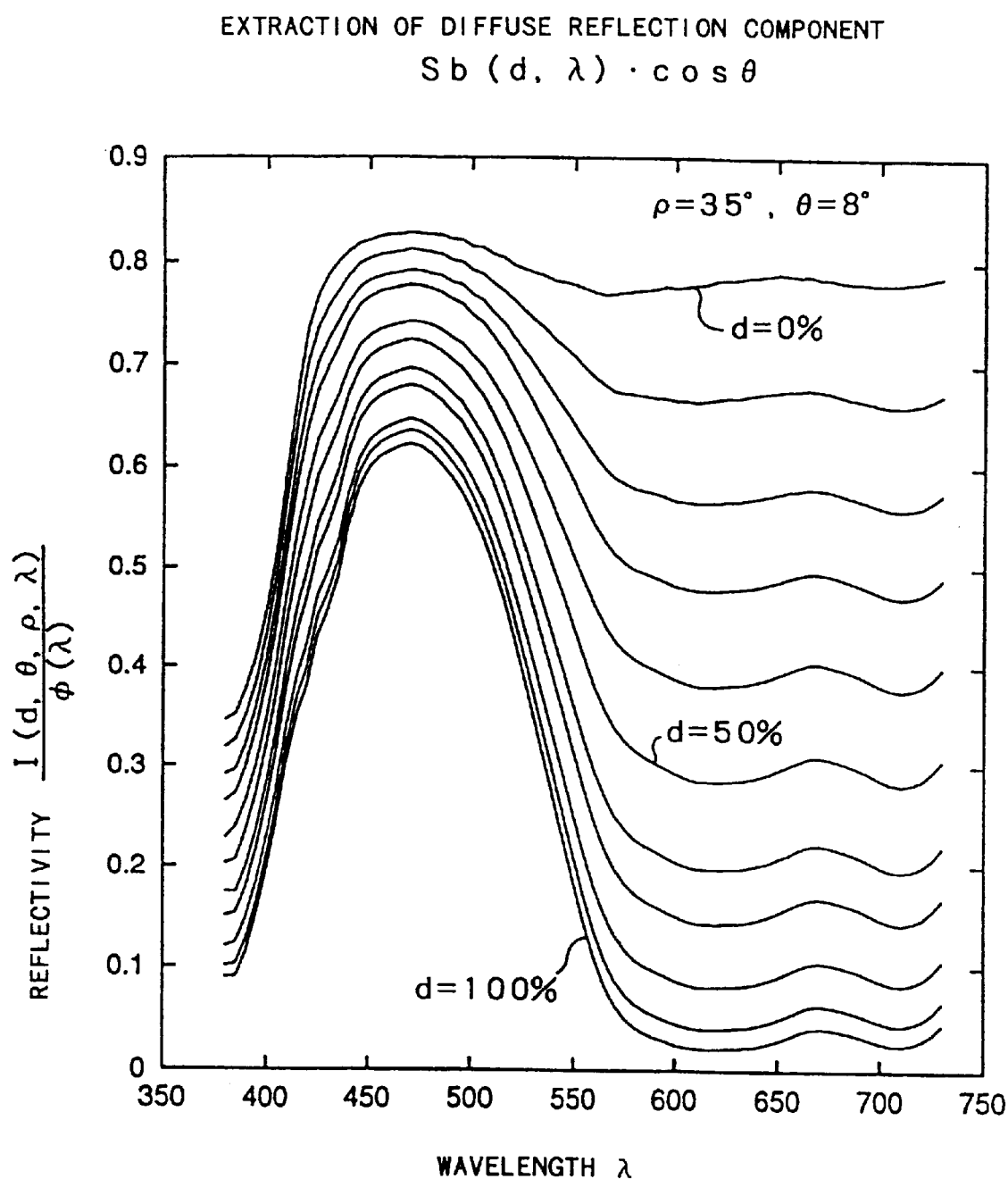
FIG. 10 is a graph showing the plot of diffuse reflection component $Sb(d,\lambda)\cos\theta$ extracted under the condition of $\rho=35°$ and $\theta=8°$.

FIG. 10 is a graph showing the plot of diffuse reflection component $Sb(d,\lambda)\cos\theta$ extracted under the condition of $\rho=35°$ and $\theta=8°$. This graph shows the wavelength dependency of the diffuse reflection component $Sb(d,\lambda)\cos\theta$ for each color chip having different dot percent d. In this embodiment, the diffuse reflection coefficient $Sb(d,\lambda)$ was calculated by dividing the diffuse reflection component by $\cos\theta$ as shown in Equation (9) given below:

$$Sb(d, \lambda) = \frac{Ib(d, \theta, \lambda)}{\cos\theta \cdot \phi(\lambda)} \quad (9)$$

The spectral reflectivities under the condition of $\rho=0°$ and $\theta=8°$ were used for the estimation of the specular reflection component $Is(d,\theta,\lambda)$. The angle of incidence $\theta$ used here was equal to that used in the extraction of the diffuse reflection component. The angle of deviation $\rho$ was set equal to $0°$ in order to select the condition realizing $fs(\rho)=1$. The detailed form of the dependency $fs(\rho)$ upon the angle of deviation is unknown, but it is known that $fs(0)=1$ according to the definition thereof. Namely when the angle of deviation $\rho$ is equal to zero, the specular reflection component $Is(d,\rho=0,\lambda)$ is equal to the product of the specular reflectivity $Ss(d,\lambda)$ and the spectrum $\phi(\lambda)$ of incident light. Determination of the specular reflection component $Is(d,\rho=0,\lambda)$ under the condition of $\rho=0$ accordingly determines the specular reflectivity $Ss(d, \lambda)$.

Based on Equation (6) discussed above, the spectral reflectivity $I(d,\theta,\rho=0,\lambda)/\phi(\lambda)$ at the angle of deviation $\rho=0$ is given by Equation (10):

$$\frac{I(d, \theta, \rho = 0, \lambda)}{\phi(\lambda)} = Sb(d, \lambda) \cdot \cos\theta + Ss(d, \lambda) \quad (10)$$

Equation (10) is rewritten to Equation (11) to determine the specular reflection component $Ss(d, \lambda)$:

$$Ss(d, \lambda) = \frac{I(d, \theta, \rho = 0, \lambda)}{\phi(\lambda)} - Sb(d, \lambda) \cdot \cos\theta \quad (11)$$

Figure 11:
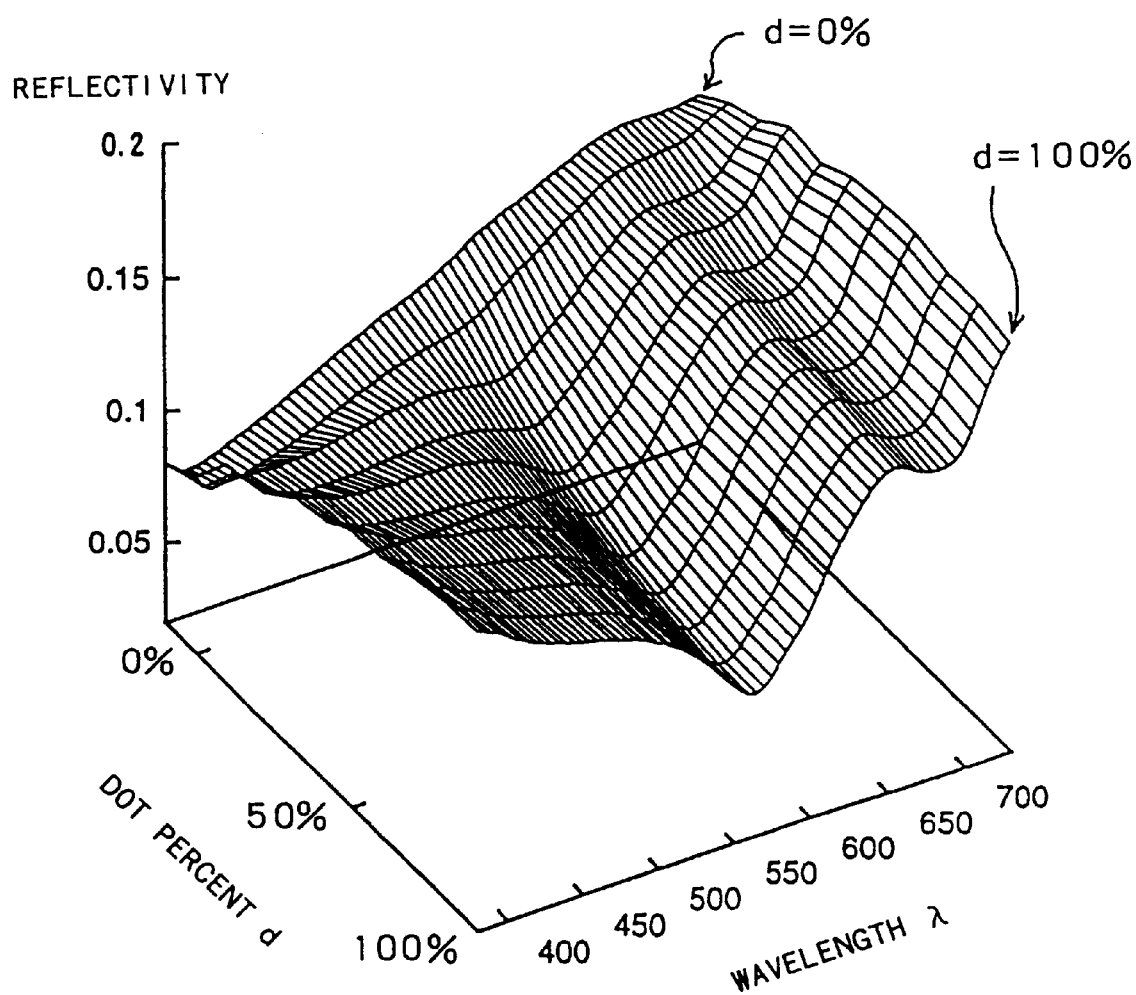
FIG. 11 is a graph showing the plot of specular reflection component $Ss(d,\lambda)$ estimated under the condition of $\theta=8°$.

FIG. 11 is a graph showing the plot of specular reflection coefficient Ss $(d,\lambda)$ estimated according to Equation (11) under the condition of $\theta=8°$. This graph shows the wavelength dependency of the specular reflection coefficient $Ss(d,\lambda)$ for each color chip having different dot percent d.

Referring back again to the flowchart of FIG. 5, the process at step S3 determined the form of $fs(\rho)$ of the specular reflection component upon the angle of deviation $\rho$. The dependency $fs(\rho)$ is also referred to as the 'specular reflectivity-damping coefficient'. As clearly understood from Equation (6) discussed above, the spectral reflectivity $I/\phi$ depends upon only the angle of deviation $\rho$ upon condition that the dot percent d, the angle of incidence $\theta$, and the wavelength $\lambda$ are all fixed. The functional form of the dependency $fs(\rho)$ was accordingly determined by measuring the dependency of the spectral reflectivity $I/\phi$ upon the angle of deviation $\rho$ while the dot percent d, the angle of incidence $\theta$, and the wavelength $\lambda$ were all fixed. It was then found that $fs(\rho)$ had the functional form of the Gaussian distribution defined by Equation (12) given below:

$$fs(\rho)=e^{-\sigma\rho^2} \quad (12)$$

wherein the constant $\sigma$ ranges from approximately 70 to 90. The unit of the angle of deviation $\rho$ is radian in Equation (12). In this embodiment $\sigma=80$ was obtained by the least square method.

The following Equation (13) is also applicable for the functional form of $fs(\rho)$.

$$fs(\rho)=\cos^n\rho \quad (13)$$

wherein the exponent n ranges from approximately 350 to 400. Both the dependency $fs(\rho)$ given by Equation (12) and by Equation (13) represent the characteristic that is equal to one when $\rho=0$ and abruptly decreases in a monotonic manner with an increase in $\rho$ in the range of $0 \leq \rho \leq 90°$.

Figure 9A:
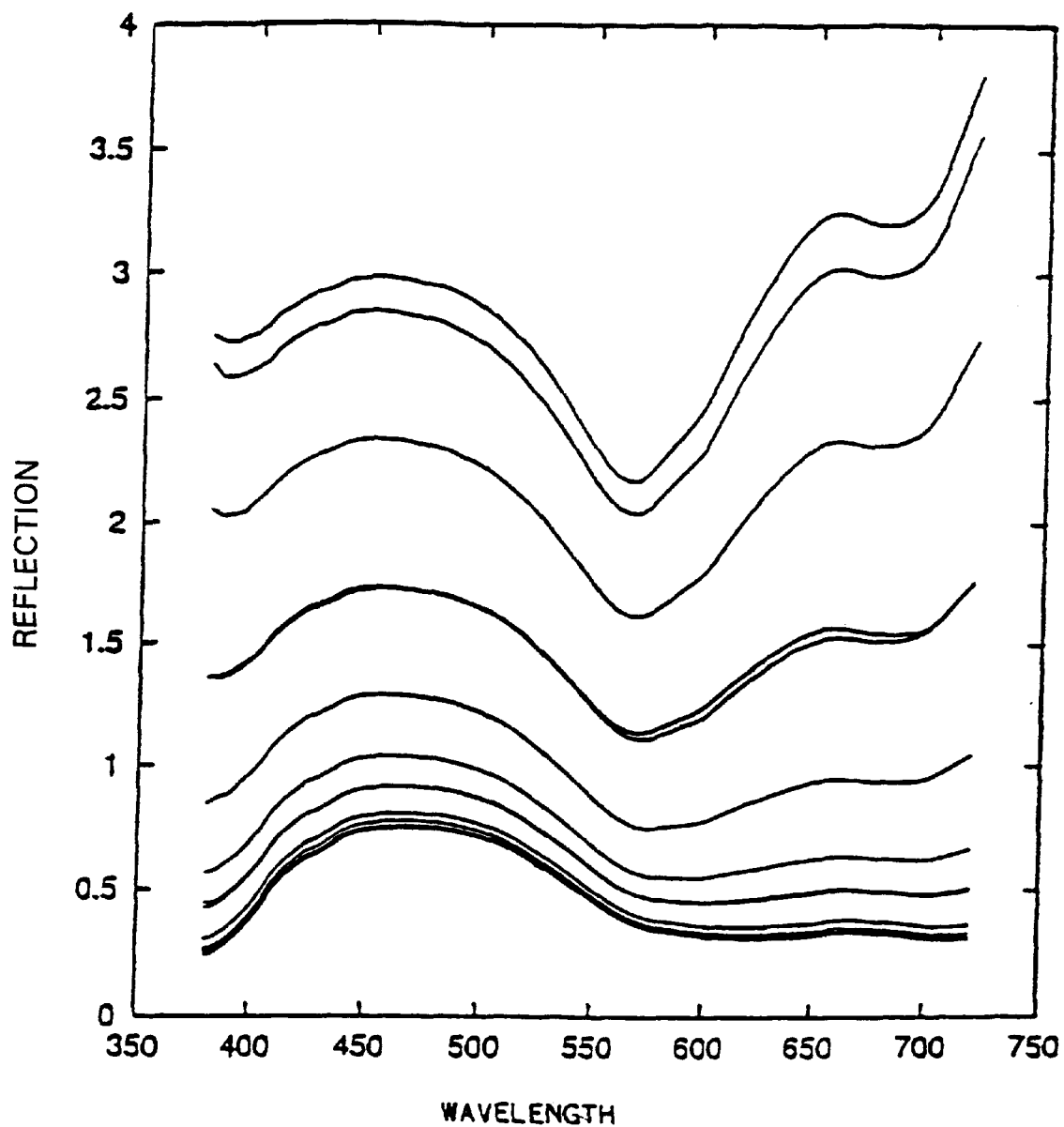
FIGS. 9(A)–9(D) show a process of determining the diffuse reflection components and the specular reflection components based on the spectral reflectivities and subsequently determining the weighting coefficients $\alpha$, $\beta$, and $\gamma$.
Figure 9B:
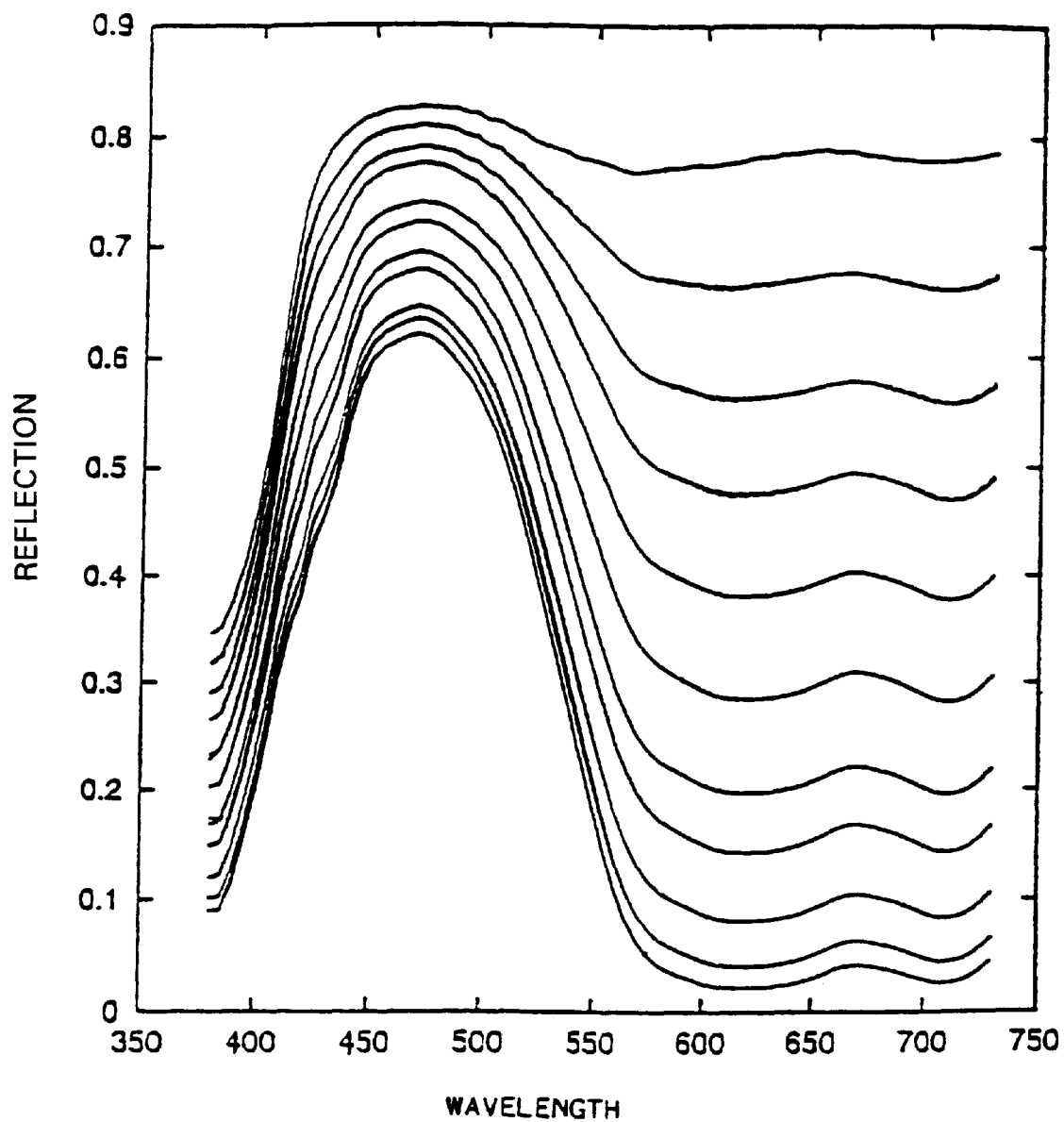
Figure 9C:
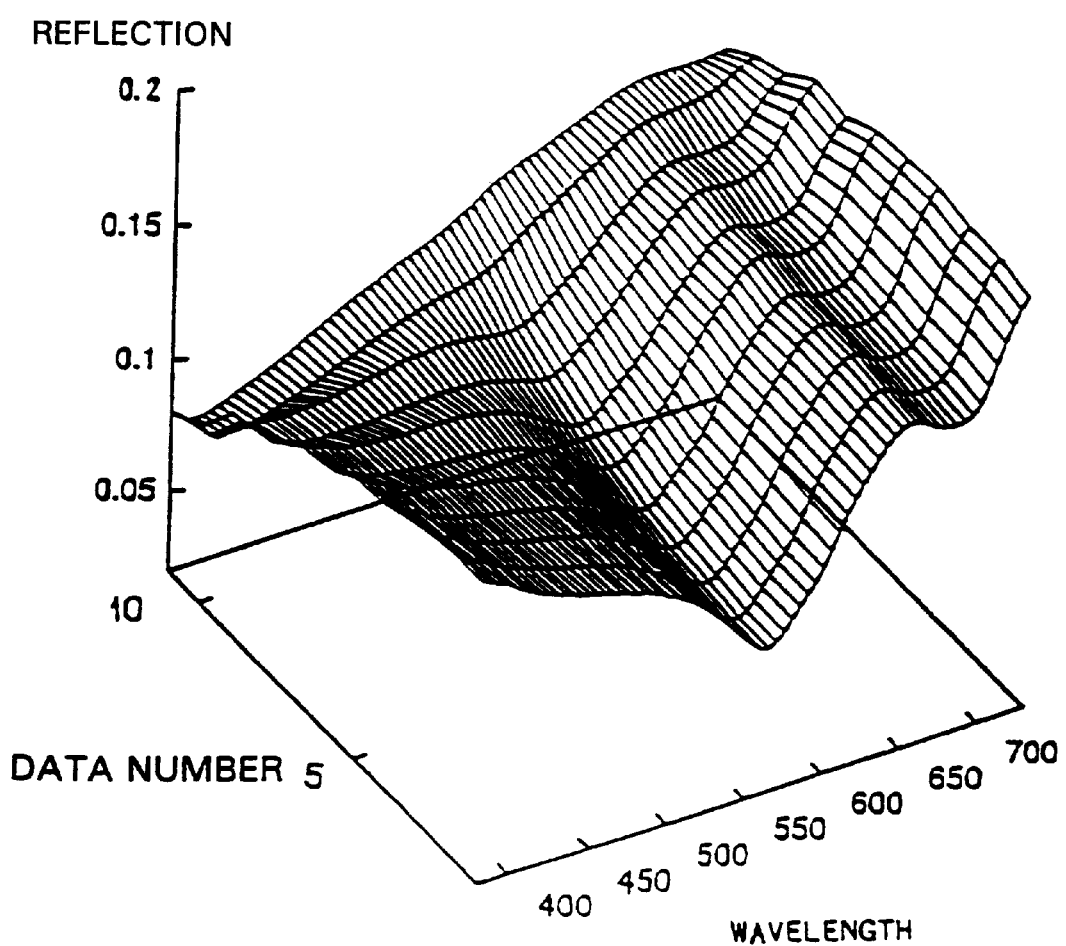
Figure 9D:
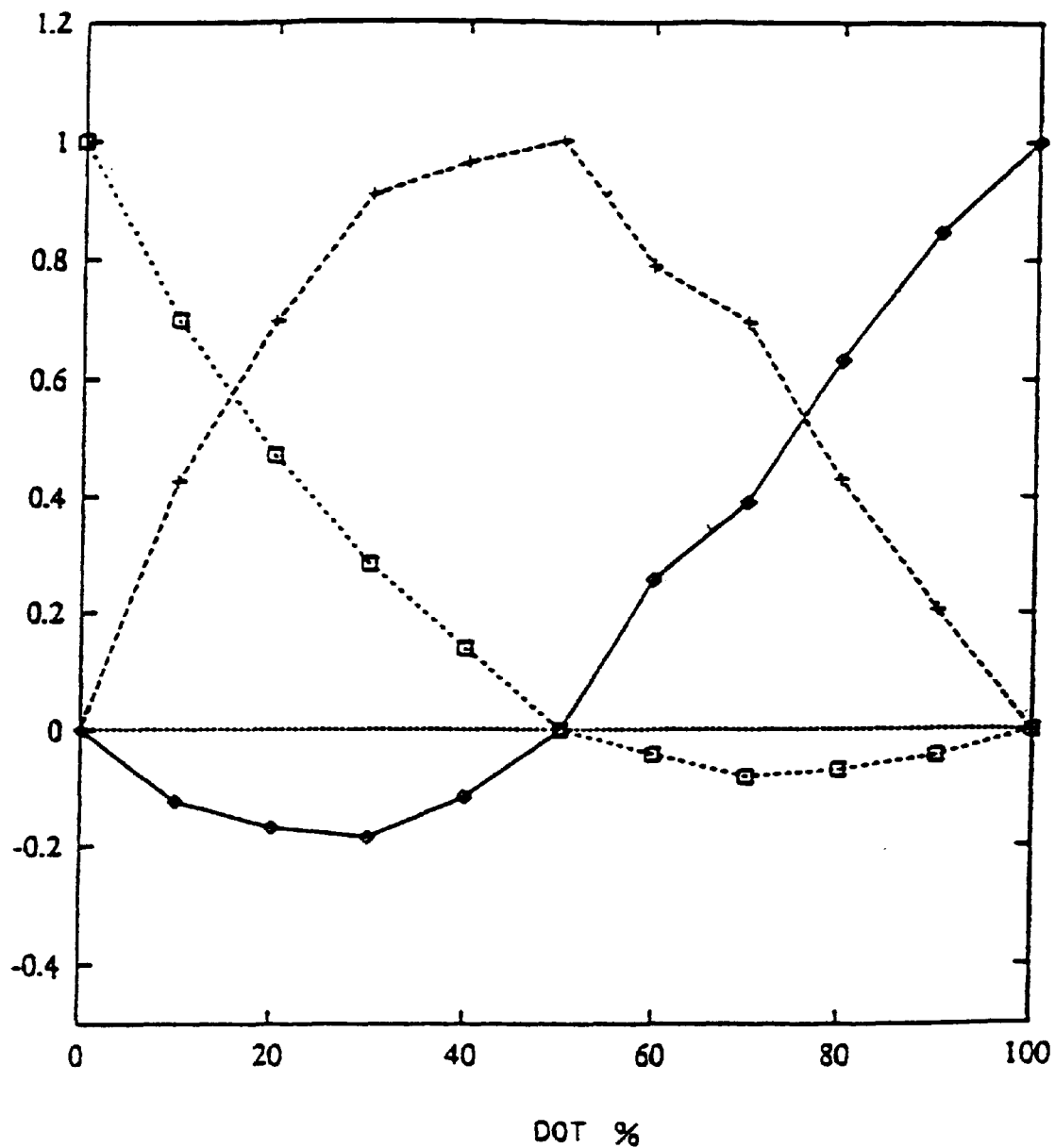

Referring back again to the flowchart of FIG. 5, the process at step S4 determined the weighting coefficients $\alpha$, $\beta$, and $\gamma$ (see FIG. 9(D)) used in Equations (7) and (8) mentioned above. In this embodiment, the weighting coefficients $\alpha$, $\beta$, and $\gamma$ were calculated from the diffuse reflection coefficient $Sb(d, \lambda)$ obtained at step S2 according to the following procedure. Equation (7) given above was expanded to simultaneous equations regarding plural values of the wavelength $\lambda$, and the simultaneous equations were written as Equations (14) and (15a)–(15c) using the matrices:

$$V_{org} = K \cdot V_{prim} \quad (14)$$

where $$V_{org} = (Sb(d, \lambda)) = \begin{pmatrix} Sb(d, \lambda\min) \\ \ldots \\ Sb(d, \lambda\max) \end{pmatrix} \quad (15a)$$

$$K = (\alpha(d) \ \beta(d) \ \gamma(d)) \quad (15b)$$

$$V_{prim} = \quad (15c)$$

$$\begin{pmatrix} Sb(0\%, \lambda) \\ Sb(50\%, \lambda) \\ Sb(100\%, \lambda) \end{pmatrix} = \begin{pmatrix} Sb(0\%, \lambda\min) & \ldots & Sb(0\%, \lambda\max) \\ Sb(50\%, \lambda\min) & \ldots & Sb(50\%, \lambda\max) \\ Sb(100\%, \lambda\min) & \ldots & Sb(100\%, \lambda\max) \end{pmatrix}$$

As shown in Equations (15a)–(15c), the matrix Vorg represents the value of the diffuse reflection coefficient Sb(d, λ) with respect to each wavelength (λmin to λmax) in the wavelength range of visible rays at an arbitrary dot percent d. The matrix K represents the weighting coefficients α(d), β(d), and γ(d). The matrix Vprim represents the values of the reference diffuse reflection coefficients Sb(0%,λ), Sb(50%, λ), and Sb(100%,λ) with respect to each wavelength (λmin to λmax). Here λmin and λmax respectively denote the minimum and the maximum of the wavelength λ of visible rays. By way of example, when the wavelength λ of visible rays is divided into 60 wavelength domains, Equation (14) corresponds to 60 simultaneous equations.

The values of the diffuse reflection coefficient Sb(d, λ) with respect to the eleven values of the dot percent d (0%, 10%, ..., 100%) (that is, the matrix Vprim) are obtained at step S2 as discussed previously. Only the matrix K representing α(d), β(d), and γ(d) is unknown in the right-hand side of Equation (14). When the simultaneous equations (Equation (14)) having the number of unknown elements less than the number of equations are solved for the unknown matrix K, the result obtained is equivalent to approximation of the unknown values α(d), β(d), and γ(d) by the method of least squares. In accordance with a concrete procedure, when the matrix K is determined according to Equation (16) for the eleven values of the dot percent d (0%, 10%, ..., 100%), eleven sets of weighting coefficients α(d), β(d), and γ(d) (d=0%, 10%, ..., 100%) are obtained.

$$K = (\alpha(d) \ \beta(d) \ \gamma(d)) = V_{org} \cdot V^{-1}_{prim} \quad (16)$$

Figure 12:
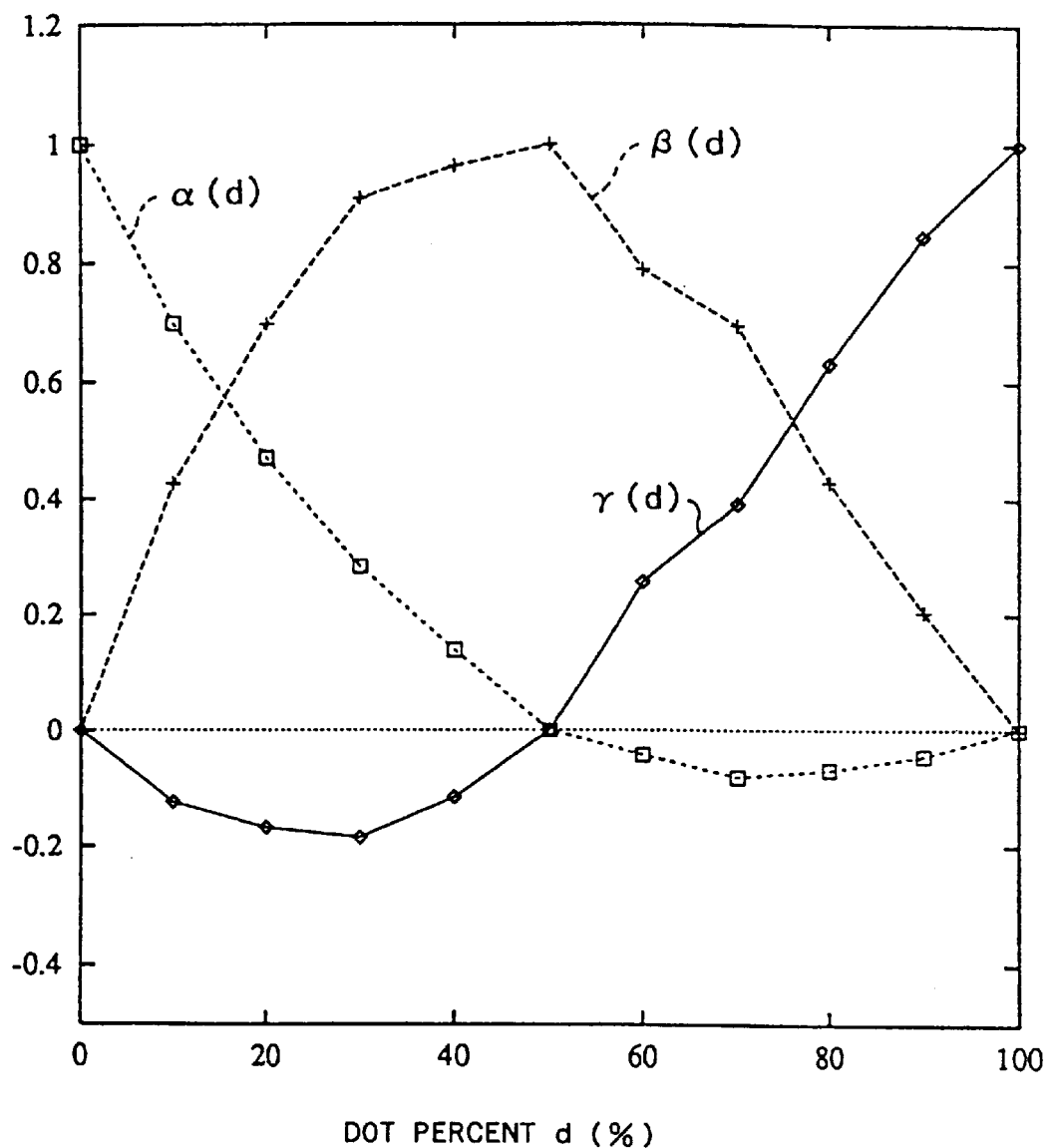
FIG. 12 is a graph showing variations in weighting coefficients $\alpha(d)$, $\beta(d)$, and $\gamma(d)$ obtained in the embodiment.

FIG. 12 is a graph showing variations in weighting coefficients α(d), β(d), and γ(d) thus obtained. The weighting coefficients α(d), β(d), and γ(d) shown in FIG. 12 have similar properties to those shown in FIG. 3. While FIG. 3 conceptually shows variations in weighting functions, FIG. 12 shows the values actually obtained in the embodiment.

The process at step S5 in the flowchart of FIG. 5 carried out simulation for the primary color based on the results obtained at steps S2 through S4. The diffuse reflection coefficient Sb(d, λ) at an arbitrary dot percent d was calculated from the weighting coefficients α(d), β(d), and γ(d) and the reference diffuse reflection coefficients Sb(0%,λ), Sb(50%,λ), and Sb(100%,λ) according to Equation (7) discussed above. The specular reflection coefficient Ss(d, λ) was calculated in a similar manner according to Equation (8) discussed above.

Figure 13:
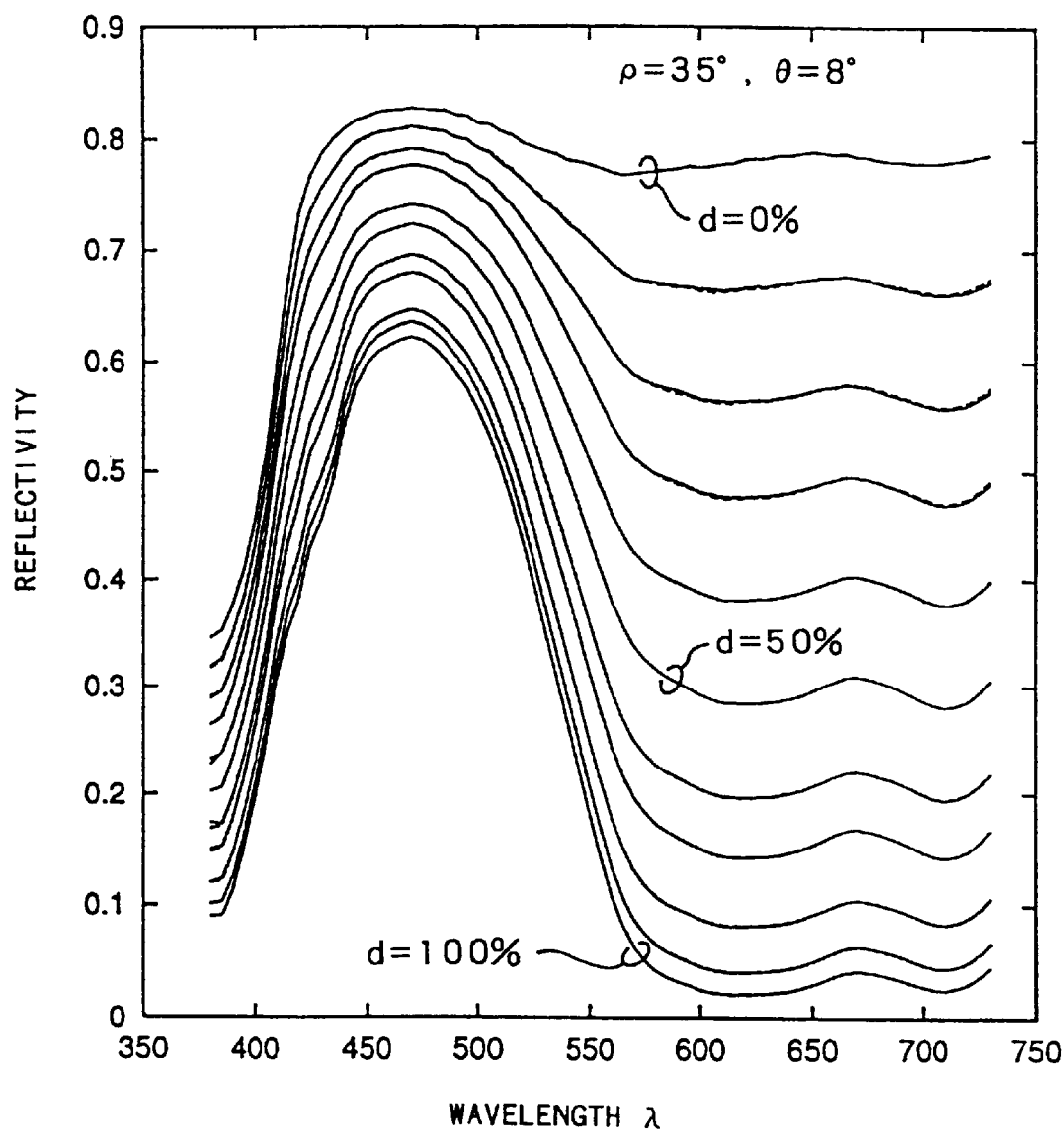
FIG. 13 is a graph showing comparison between the measured values of the diffuse reflection component $S(d,\lambda)\cos\theta$ and the results of simulation.

FIG. 13 is a graph showing comparison between the measured values of the diffuse reflection component Sb(d, λ)cos θ (shown by the solid lines) and the results of simulation according to Equation (7) (shown by the broken lines). The solid lines substantially coincide with the broken lines. This shows that the measured values well agree with the results of simulation. The measured values of the specular reflection component also agree well with the result of simulation.

Referring back to the flowchart of FIG. 5, steps S6 and S7 show a process of reproducing a print with an output device, based on the reference reflection coefficients Sb and Ss and the weighting coefficients ξ, η, α, β, and γ obtained by the processing of steps S1 through S4. At step S6, a rendering operation by computer graphics is carried out to generate color data for reproducing the colors of a color print.

Figure 14:
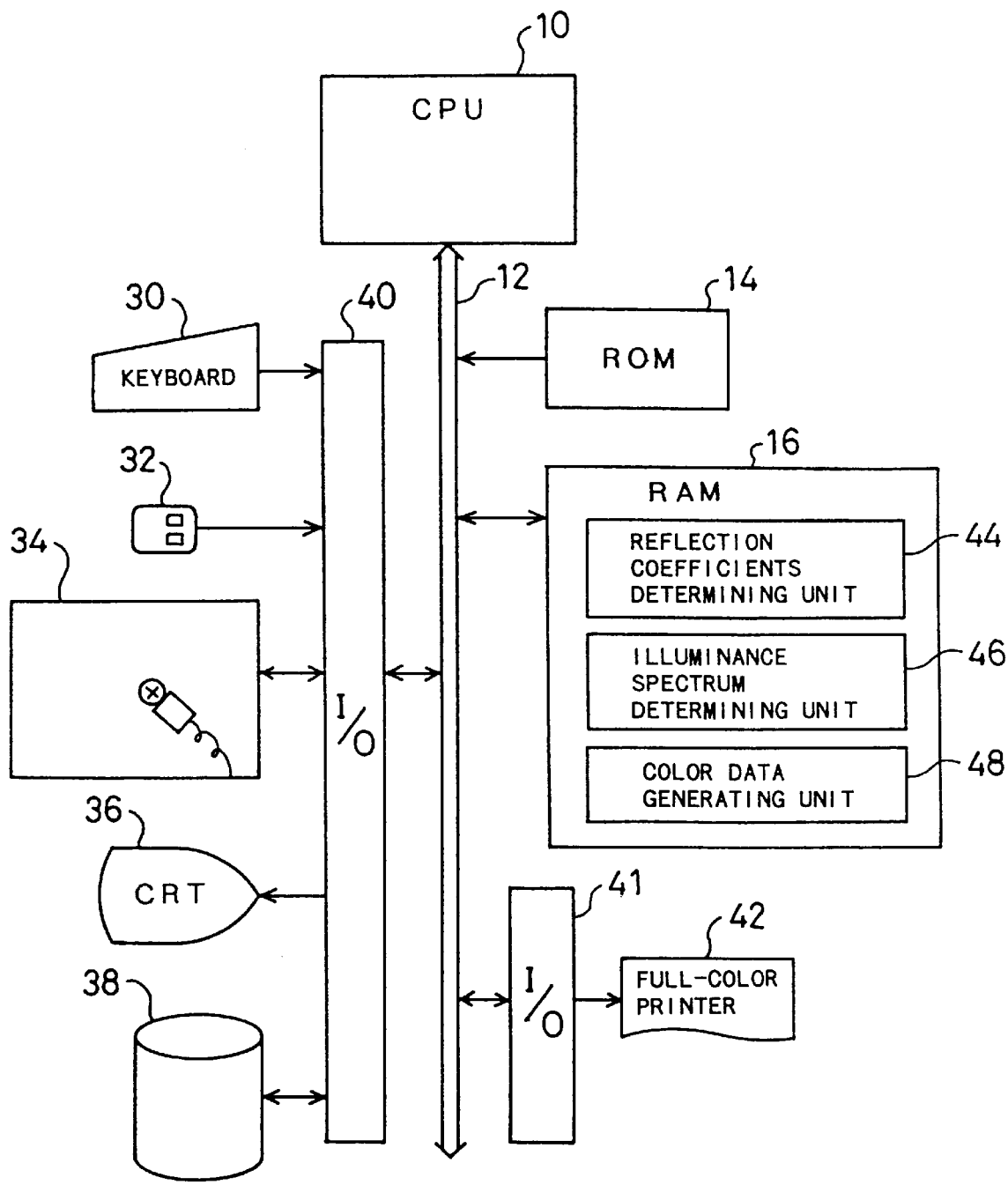
FIG. 14 is a block diagram illustrating a computer system for reproducing colors of a print arranged in a three-dimensional space, as an embodiment of the present invention.

FIG. 14 is a block diagram illustrating a computer system for reproducing a color print arranged in a three-dimensional space, as an embodiment of the present invention. The computer system includes CPU 10 and a bus line 12. ROM 14 and RAM 16 are connected to the bus line 12. A keyboard 30, a mouse 32, a digitizer 34, a color CRT 36, a magnetic disk 38, and a full-color printer 42 are also connected to the bus line 12 via input/output interfaces 40 and 41.

The RAM 16 stores applications programs that implement functions of: a reflection coefficients determining unit 44, a illuminance spectrum determining unit 46, and a color data generating unit 48. The reflection coefficients determining unit 44 determines reflection coefficients Sb and Ss according to Equations (7) and (8) discussed above. The illuminance spectrum determining unit 46 determines the illuminance spectrum I(d,θ,ρ,λ) according to Equation (4) given above. The color data generating unit 48 obtains three stimulus values X(d), Y(d), and Z(d) according to Equations (5a)–(5c) given above, and converts the stimulus values to color data corresponding to the colorimetric system in the output device. The CPU 10 executes the applications programs stored in the RAM 16 to implement the functions of the respective units. The computer system also stores an applications program for carrying out a rendering operation to reproduce a color print arranged in a three-dimensional space on a color display.

Figure 15:
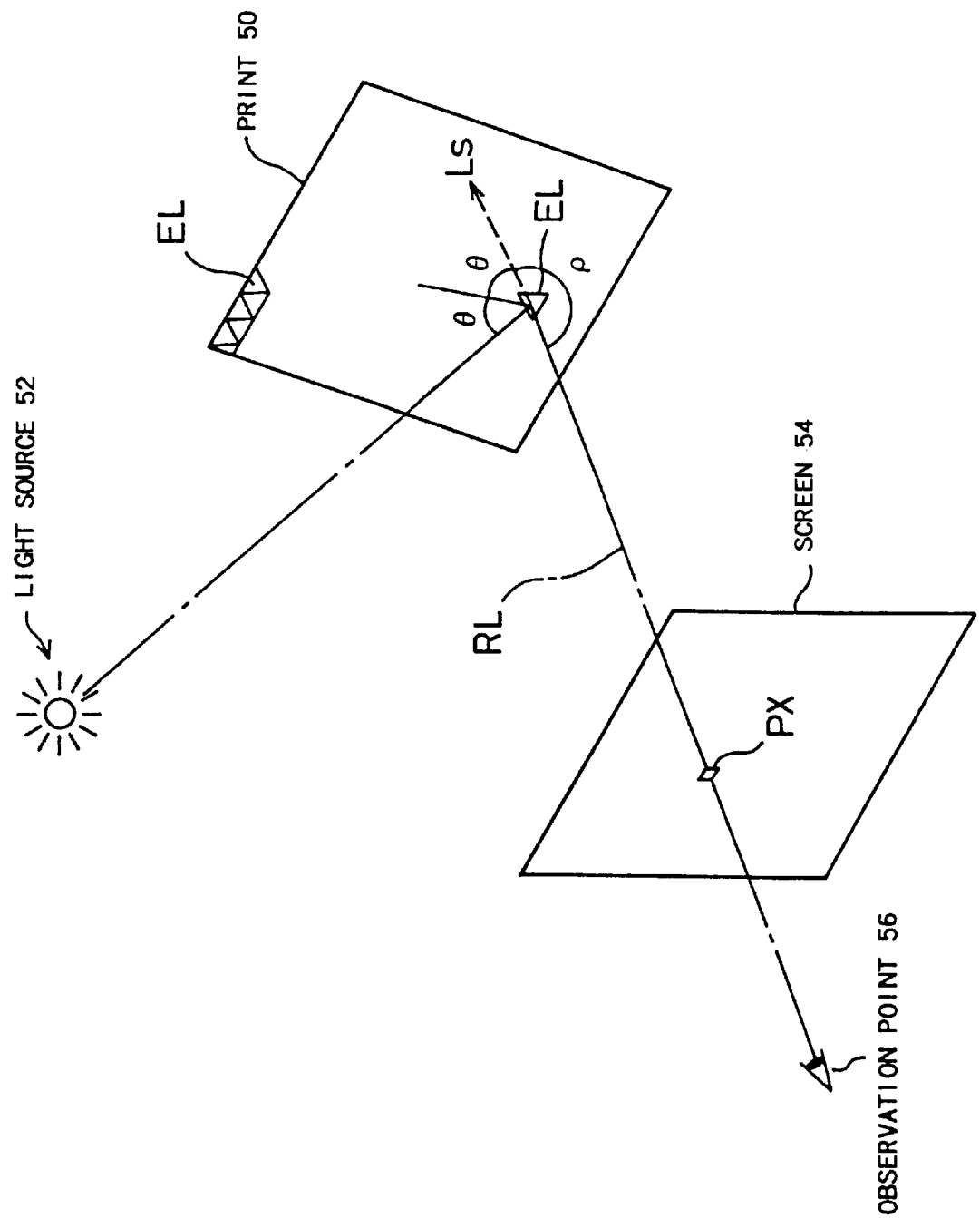
FIG. 15 shows a three-dimensional arrangement for reproducing the colors of a print by a ray tracing method.

FIG. 15 shows a three-dimensional arrangement of a print 50, a light source 52, a screen 54 on the CRT, and an observation point, which are used in a ray tracing method. The ray tracing method is a known rendering technique in three-dimensional computer graphics. The ray tracing method traces a line of sight RL, which passes through each pixel PX on the screen 54 and the observation point 56, inversely from the observation point 56 to the light source, thereby determining color data (RGB data) at each pixel PX on the screen 54. The print 50 is divided into a plurality of small polygons EL in advance. Each small polygon EL corresponds to a target point in the claimed invention. Although each small polygon EL is a plane, the whole print 50 may be modeled to have a three-dimensional curvature. The angle of incidence θ and the angle of deviation ρ are defined in a specific small polygon EL existing at the intersection of the line of sight RL and the print 50 as shown in FIG. 15.

In the process of ray tracing, the reflection coefficients determining unit 44 determines the reflection coefficients Sb(d, λ) and Ss(d, λ) according to Equations (7) and (8) discussed above. The illuminance spectrum determining unit 46 determines the illuminance spectrum I(d,θ,ρ,λ) according to Equation (4) given above. The color data generating unit 48 integrates the illuminance spectrum I(d,θ,ρ,λ) thus obtained according to Equations (5a)–(5c) given above to determine three stimulus values X, Y, and Z.

At step S7 in the flowchart of FIG. 5, the color data generating unit 48 converts the three stimulus values thus obtained to RGB data and allocate the RGB data to the pixels on the color CRT 36. In accordance with a concrete procedure, RGB data are stored at each pixel position in a frame memory. A color print is displayed on the color CRT 36 according to the RGB data in the frame memory. Conversion of the XYZ colorimetric system to the RGB colorimetric system depends upon the characteristics of the output device. Using conversion equations corresponding to the output device thereby enables the accurate color reproduction in the expressible range of colors in the output device.

In the above described embodiment, reflection coefficients $Sb(d,\lambda)$ and $Ss(d,\lambda)$ at an arbitrary dot percent is given by interpolating the reference reflection coefficients at three reference dot percents of 0%, 50%, and 100%. Therefore the reflection coefficients Sb and Ss can be readily determined within the entire range of the dot percent. This accordingly enables a print of an arbitrary dot percent to be reproduced with high precision on a display.

The present invention is not restricted to the above embodiment or its applications, but there may be many modifications, changes, and alterations without departing from the scope or spirit of the main characteristics of the present invention. Some examples of possible modification are given below.

Figure 16:
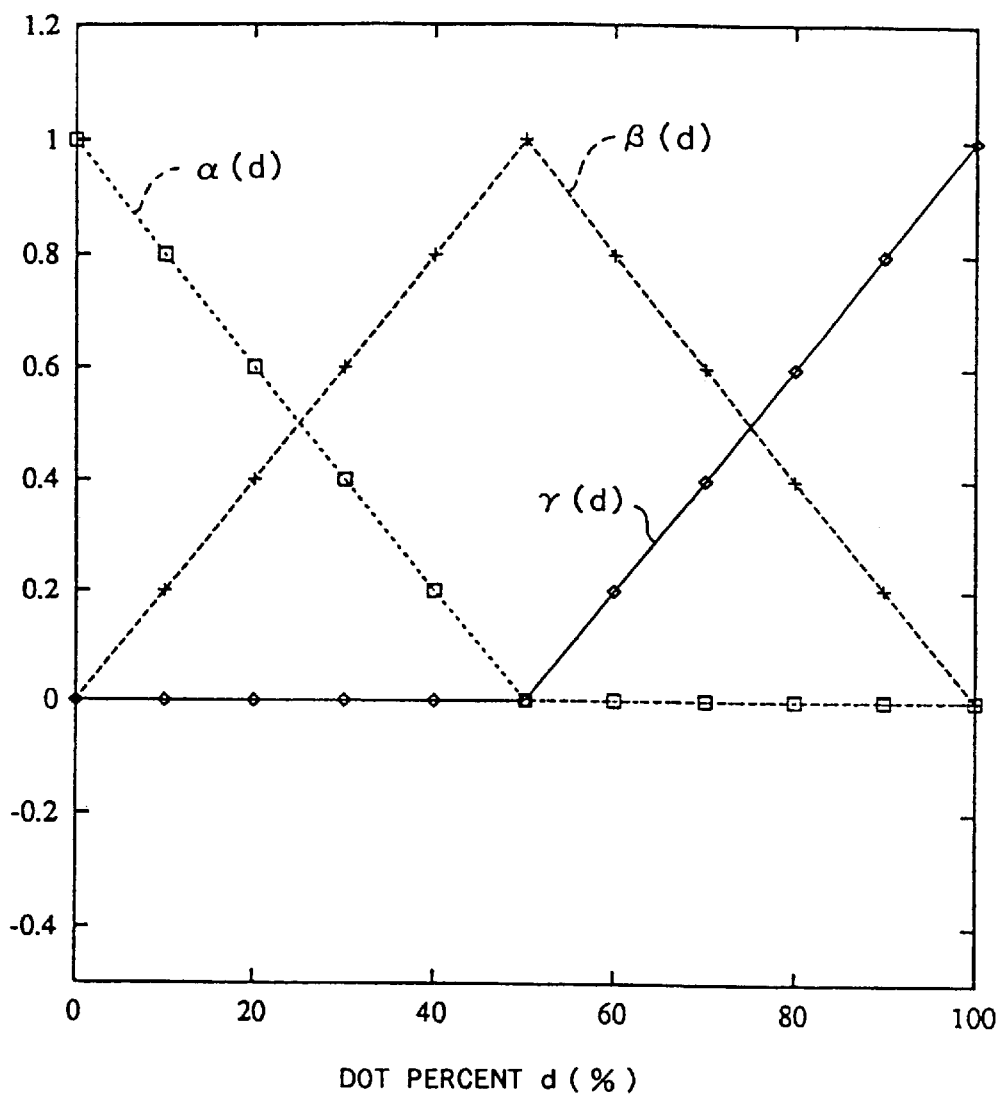
FIG. 16 is a graph showing simplified variations in weighting coefficients $\alpha(d)$, $\beta(d)$, and $\gamma(d)$.

FIG. 16 is a graph showing simplified variations in weighting coefficients $\alpha(d)$, $\beta(d)$, and $\gamma(d)$ shown in FIG. 12. Referring to FIG. 16, in the range of the dot percent from 0% to 50%, the first weighting coefficient $\alpha(d)$ linearly decreases from 1.0 to 0, while the second weighting coefficient $\beta(d)$ linearly increases from 0 to 1.0. In the range of the dot percent from 50% to 100%, on the other hand, the second weighting coefficient $\beta(d)$ linearly decreases from 1.0 to 0, while the third weighting coefficient $\gamma(d)$ linearly increases from 0 to 1.0. In other words, in the range of the dot percent from 0% to 50%, the reflection coefficient at an arbitrary dot percent d (Equation (7)) is obtained by linear interpolation of the first and the second reference reflection coefficients $Sb(0\%,\lambda)$ and $Sb(50\%,\lambda)$. In the range of the dot percent from 50% to 100%, on the other hand, the reflection coefficient at the arbitrary dot percent d is obtained by linear interpolation of the second and the third reference reflection coefficients $Sb(50\%,\lambda)$ and $Sb(100\%,\lambda)$.

The graph of FIG. 16 is similar to the graph of FIG. 12 obtained in the above embodiment. Simulation of a print can thus be carried out with a rather high accuracy using the weighting coefficients of FIG. 16. In case that the graph of FIG. 16 is used, the processing of step S4 may be omitted from the flowchart of FIG. 5.

Equations (7) and (8) may be replaced with other Equations to determine the reflection coefficients Sb and Ss at an arbitrary dot percent d of the primary color. Generalization of Equations (7) and (8) gives Equations (17a) and (17b):

$$Sb(d, \lambda) = \sum_{i=1}^{N} a_i(d) \cdot Sb(d_i, \lambda) \quad (17a)$$

$$Ss(d, \lambda) = \sum_{j=1}^{M} b_j(d) \cdot Ss(d_j, \lambda) \quad (17b)$$

wherein $a_i(d)$ denotes a weighting coefficient at a dot percent d with respect to a reference diffuse reflection coefficient $Sb(d_i,\lambda)$ related to an i-th reference dot percent $d_i$; $b_j(d)$ denotes a weighting coefficient at the dot percent d with respect to a reference specular reflection coefficient $Ss(d_j,\lambda)$ related to a j-th reference dot percent $d_j$; and N and M are integers of not less than 2. The reflection coefficients Sb and Ss at an arbitrary dot percent d are generally expressed as a linear combination of plural reference reflection coefficients, respectively. In case that N=M=3 in Equations (17a) and (17b), the weighting coefficient $a_i(d)$ (i=1 to 3) corresponds to the weighting coefficients $\alpha(d)$, $\beta(d)$, and $\gamma(d)$ in Equation (7), and the weighting coefficient $b_j(d)$ (j=1 to 3) corresponds to the weighting coefficients $\alpha(d)$, $\beta(d)$, and $\gamma(d)$ in Equation (8). Although it is preferable that at least either N or M has the value of not less than 3, both N and M may be equal to 2.

The present invention is not restricted to the reproduction of primary colors, but the present invention is also applicable to the reproduction of secondary colors and higher order colors. In reproducing a secondary color, which is a color painted with two inks, reflection coefficients are first determined for two primary colors constituting the secondary color in the same manner as the above embodiment. Then the reflection coefficients for the secondary color is determined by interpolating the reflection coefficients for the primary colors. The illuminance spectrum for the secondary color will be calculated from the reflection coefficients. A tertiary and higher order color will be reproduced by determining its reflection coefficients through linear interpolation of reflection coefficients for a plurality of primary colors. Alternatively, the reflection coefficients of a tertiary or higher order color (and its illuminance spectrum) can be obtained by repeating the process of determining reflection coefficients for a (n+1)-order color by interpolating reflection coefficients for n-order colors while increasing the integer n.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of simulating a color print arranged in a three-dimensional space by rendering said color print and thereby reproducing said color print with an output device, said method using an illuminance spectrum $I(d,\theta,\rho,\lambda)$ of a reflected light beam, which is observed at a predetermined observation point when a target point on said color print is irradiated with a light beam having a predetermined luminance spectrum $\phi(\lambda)$, said illuminance spectrum $I(d,\theta,\rho,\lambda)$ being given by the following Equation:

$$I(d,\theta,\rho,\lambda) = \{Sb(d,\lambda) \cdot fb(\theta) + Ss(d,\lambda) \cdot fs(\rho)\} \cdot \phi(\lambda) + Ie(\lambda)$$

where d denotes a dot percent at said target point, $\lambda$ denotes a wavelength of the light beam, $Sb(d,\lambda)$ and $Ss(d,\lambda)$ respectively denote a first reflection coefficient and a second reflection coefficient for the dot percent, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at said observation point, said method comprising the steps of:

(a) determining the first reflection coefficient $Sb(d,\lambda)$ in said Equation by interpolation of a plurality of first reference reflection coefficients $Sb(d_i,\lambda)$ for a plurality of reference dot percents $d_i$, and determining the second reflection coefficient $Ss(d,\lambda)$ by interpolation of a plurality of second reference reflection coefficients $Ss(d_j,\lambda)$ for a plurality of reference dot percents $d_j$;

(b) determining said illuminance spectrum $I(d,\theta,\rho,\lambda)$ of the reflected light beam according to said Equation using said first reflection coefficient $Sb(d,\lambda)$ and said second reflection coefficient $Ss(d,\lambda)$ determined in said step (a); and (c) obtaining color data representing said target point in a colorimetric system suitable for said output device from said illuminance spectrum $I(d,\theta,\rho,\lambda)$ of the reflected light beam.

2. A method in accordance with claim 1, wherein
said first reflection coefficient $Sb(d,\lambda)$ and said second reflection coefficient $Ss(d,\lambda)$ are given by:

$$Sb(d,\lambda) = \sum_{i=1}^{N} a_i(d) \cdot Sb(d_i,\lambda)$$

$$Ss(d,\lambda) = \sum_{j=1}^{M} b_j(d) \cdot Ss(d_j,\lambda)$$

where $a_i(d)$ denotes weighting coefficients for said first reference reflection coefficients $Sb(d_i,\lambda)$ at the dot percent d, $b_j(d)$ denotes weighting coefficients for said second reference reflection coefficients $Ss(d_j,\lambda)$ at the dot percent d, and N and M are integers no less than two.

3. A method in accordance with claim 1, wherein said characteristics $fb(\theta)$ and $fs(\rho)$ are give by:

$$fb(\theta) = \cos\theta$$

$$fs(\rho) = e^{-\sigma\rho^2}$$

where $\sigma$ is a constant.

4. A method in accordance with claim 2, wherein said step (a) comprises the steps of:

determining said weighting coefficients $a_i(d)$ by interpolating a plurality of reference weighting coefficients $a_i(d_k)$ at a plurality of dot percents $d_k$; and determining said weighting coefficients $b_j(d)$ by interpolating a plurality of reference weighting coefficients $b_j(d_l)$ at a plurality of dot percents $d_l$.

5. An apparatus for simulating a color print arranged in a three-dimensional space by rendering said color print and thereby reproducing said color print with an output device, said apparatus using an illuminance spectrum $I(d,\theta,\rho,\lambda)$ of a reflected light beam, which is observed at a predetermined observation point when a target point on said color print is irradiated with a light beam having a predetermined luminance spectrum $\phi(\lambda)$, said illuminance spectrum $I(d,\theta,\rho,\lambda)$ being given by the following Equation:

$$I(d,\theta,\rho,\lambda) = \{Sb(d,\lambda) \cdot fb(\theta) + Ss(d,\lambda) \cdot fs(\rho)\} \cdot \phi(\lambda) + Ie(\lambda)$$

where d denotes a dot percent at said target point, $\lambda$ denotes a wavelength of the light beam, $Sb(d,\lambda)$ and $Ss(d,\lambda)$ respectively denote a first reflection coefficient and a second reflection coefficient for the dot percent, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at said observation point, said apparatus comprising:

reflection coefficients determining means for determining the first reflection coefficient $Sb(d,\lambda)$ in said Equation by interpolation of a plurality of first reference reflection coefficients $Sb(d_i,\lambda)$ for a plurality of reference dot percents $d_i$, and determining the second reflection coefficient $Ss(d,\lambda)$ by interpolation of a plurality of second reference reflection coefficients $Ss(d_j,\lambda)$ for a plurality of reference dot percents $d_j$;

means for determining said illuminance spectrum $I(d,\theta,\rho,\lambda)$ of the reflected light beam according to said Equation using said first reflection coefficient $Sb(d,\lambda)$ and said second reflection coefficient $Ss(d,\lambda)$ determined by said reflection coefficients determining means; and means for obtaining color data representing said target point in a colorimetric system suitable for said output device from said illuminance spectrum $I(d,\theta,\rho,\lambda)$ of the reflected light beam.

6. An apparatus in accordance with claim 5, wherein
said first reflection coefficient $Sb(d,\lambda)$ and said second reflection coefficient $Ss(d,\lambda)$ are given by:

$$Sb(d,\lambda) = \sum_{i=1}^{N} a_i(d) \cdot Sb(d_i,\lambda)$$

$$Ss(d,\lambda) = \sum_{j=1}^{M} b_j(d) \cdot Ss(d_j,\lambda)$$

where $a_i(d)$ denotes weighting coefficients for said first reference reflection coefficients $Sb(d_i,\lambda)$ at the dot percent d, $b_j(d)$ denotes weighting coefficients for said second reference reflection coefficients $Ss(d_j,\lambda)$ at the dot percent d, and N and M are integers no less than two.

7. An apparatus in accordance with claim 5, wherein said characteristics $fb(\theta)$ and $fs(\rho)$ are give by:

$$fb(\theta) = \cos\theta$$

$$fs(\rho) = e^{-\sigma\rho^2}$$

where $\sigma$ is a constant.

8. An apparatus in accordance with claim 6, wherein said reflection coefficients determining means comprises:

means for determining said weighting coefficients $a_i(d)$ by interpolating a plurality of reference weighting coefficients $a_i(d_k)$ at a plurality of dot percents $d_k$; and means for determining said weighting coefficients $b_j(d)$ by interpolating a plurality of reference weighting coefficients $b_j(d_l)$ at a plurality of dot percents $d_l$.

9. A computer program product for simulating a color print arranged in a three-dimensional space by rendering said color print and thereby reproducing said color print with an output device, said computer program product comprising:

a computer readable storage medium; and a computer program code means stored on said computer readable storage medium, said computer program code means comprising:

first program code means using an illuminance spectrum $I(d,\theta,\rho,\lambda)$ of a reflected light beam, which is observed at a predetermined observation point when a target point on said color print is irradiated with a light beam having a predetermined luminance spectrum $\phi(\lambda)$, said illuminance spectrum $I(d,\theta,\rho,\lambda)$ being given by the following Equation:

$$I(d,\theta,\rho,\lambda)=\{Sb(d,\lambda)\cdot fb(\theta)+Ss(d,\lambda)\cdot fs(\rho)\}\cdot \phi(\lambda)+Ie(\lambda)$$

where d denotes a dot percent at said target point, $\lambda$ denotes a wavelength of the light beam, $Sb(d,\lambda)$ and $Ss(d,\lambda)$ respectively denote a first reflection coefficient and a second reflection coefficient for the dot percent, $\theta$ denotes an angle of reflection, $fb(\theta)$ denotes a $\theta$-dependent characteristic, $\rho$ denotes an angle of deviation of an observing direction from a reflecting direction of the light beam, $fs(\rho)$ denotes a $\rho$-dependent characteristic, and $Ie(\lambda)$ represents an illuminance spectrum of ambient light observed at said observation point, said first program code means causing a computer to determine the first reflection coefficient $Sb(d,\lambda)$ in said Equation by interpolation of a plurality of first reference reflection coefficients $Sb(d_i,\lambda)$ for a plurality of reference dot percents $d_i$, and to determine the second reflection coefficient $Ss(d,\lambda)$ by interpolation of a plurality of second reference reflection coefficients $Ss(d_j,\lambda)$ for a plurality of reference dot percents $d_j$;

second program code means for causing the computer to determine said illuminance spectrum $I(d,\theta,\rho,\lambda)$ of the reflected light beam according to said Equation using said first reflection coefficient $Sb(d,\lambda)$ and said second reflection coefficient $Ss(d,\lambda)$ determined by said first program code means; and third program code means for causing the computer to obtain color data representing said target point in a calorimetric system suitable for said output device from said illuminance spectrum $I(d,\theta,\rho,\lambda)$ of the reflected light beam.

* * * * *